United States Patent
Maruyama et al.

(10) Patent No.: US 12,222,082 B2
(45) Date of Patent: Feb. 11, 2025

(54) VEHICLE LAMP HAVING RADAR WITH CONCEALING PART AND ELECTROMAGNETIC ABSORBING COVER

(71) Applicant: KOITO MANUFACTURING CO., LTD., Tokyo (JP)

(72) Inventors: Yuta Maruyama, Shizuoka (JP); Yoshihiro Katsurada, Shizuoka (JP); Yuichi Watano, Shizuoka (JP); Osamu Kuboyama, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/530,762

(22) Filed: Dec. 6, 2023

(65) Prior Publication Data
US 2024/0110686 A1    Apr. 4, 2024

Related U.S. Application Data

(63) Continuation of application No. 17/628,069, filed as application No. PCT/JP2020/027938 on Jul. 17, 2020, now Pat. No. 11,873,964.

(30) Foreign Application Priority Data

Jul. 18, 2019   (JP) .................. 2019-132826
Jul. 23, 2019   (JP) .................. 2019-135290
(Continued)

(51) Int. Cl.
*F21S 45/10*    (2018.01)
*B60Q 1/00*    (2006.01)
(Continued)

(52) U.S. Cl.
CPC ............ *F21S 45/10* (2018.01); *B60Q 1/0023* (2013.01); *B60Q 1/04* (2013.01); *F21S 41/28* (2018.01); *G01S 7/027* (2021.05); *G01S 13/931* (2013.01)

(58) Field of Classification Search
CPC .......... F21S 45/10; F21S 41/28; B60Q 1/0023
See application file for complete search history.

(56) References Cited

U.S. PATENT DOCUMENTS

2007/0164417 A1    7/2007    Todd et al.
2015/0043614 A1    2/2015    Tari et al.
(Continued)

FOREIGN PATENT DOCUMENTS

CN    104011518 A    8/2014
DE    102011115829 A1    4/2013
(Continued)

OTHER PUBLICATIONS

First Office Action issued in corresponding Chinese Patent Application No. 202010708911.5, mailed on Oct. 23, 2024 (15 pages).
(Continued)

*Primary Examiner* — Robert J May
(74) *Attorney, Agent, or Firm* — Osha Bergman Watanabe & Burton LLP

(57) ABSTRACT

A right-side vehicle lamp (2R) comprises: a lamp housing (14); a lamp cover (12) that covers an opening in the lamp housing (14); a low-beam illumination unit (3) positioned inside a lamp chamber (S) formed from the lamp housing (14) and the lamp cover (12); radar (5) configured so as to emit radio waves outside the vehicle, thereby acquiring radar data; and a shielding part (6) positioned so as to face the radar (5) so as to shield the radar (5) from the outside of the vehicle, the shielding part (6) being configured so as to transmit the radio waves emitted from the radar (5). The
(Continued)

shielding part (6) is formed integrally with the lamp cover (12). The boundary (B) between the shielding part (6) and the lamp cover (12) is positioned outside the field of view (Fv) of the radar (5).

7 Claims, 23 Drawing Sheets

(30) Foreign Application Priority Data

| | | | |
|---|---|---|---|
| Jul. 26, 2019 | (JP) | ................................ | 2019-138204 |
| Jul. 26, 2019 | (JP) | ................................ | 2019-138205 |
| Jul. 26, 2019 | (JP) | ................................ | 2019-138206 |

(51) Int. Cl.
  *B60Q 1/04* (2006.01)
  *F21S 41/20* (2018.01)
  *G01S 7/02* (2006.01)
  *G01S 13/931* (2020.01)

(56) References Cited

U.S. PATENT DOCUMENTS

| | | |
|---|---|---|
| 2018/0203110 A1* | 7/2018 | Watanabe ............... G01S 7/027 |
| 2018/0267390 A1 | 9/2018 | Kim et al. |

FOREIGN PATENT DOCUMENTS

| | | |
|---|---|---|
| DE | 102013021819 A1 | 6/2015 |
| DE | 102018008559 A1 | 3/2019 |
| JP | 2010-010100 A | 1/2010 |
| JP | 2010-069989 A | 4/2010 |
| JP | 5285405 B2 | 9/2013 |
| JP | 2015-076352 A | 4/2015 |

OTHER PUBLICATIONS

Notice of Reasons for Refusal issued in corresponding Japanese Patent Application No. 2024-076583, mailed on Dec. 24, 2024 (10 pages).

* cited by examiner

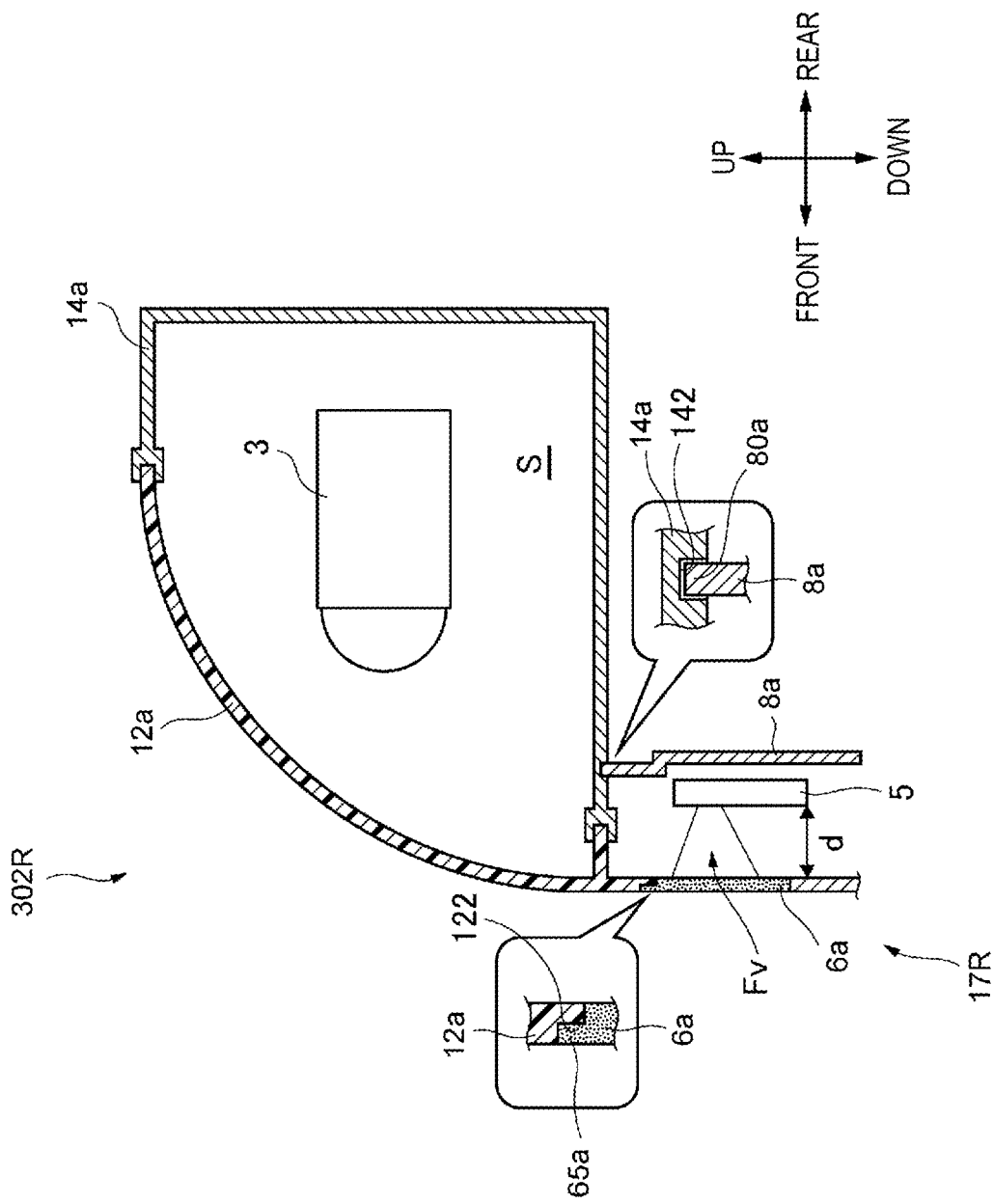

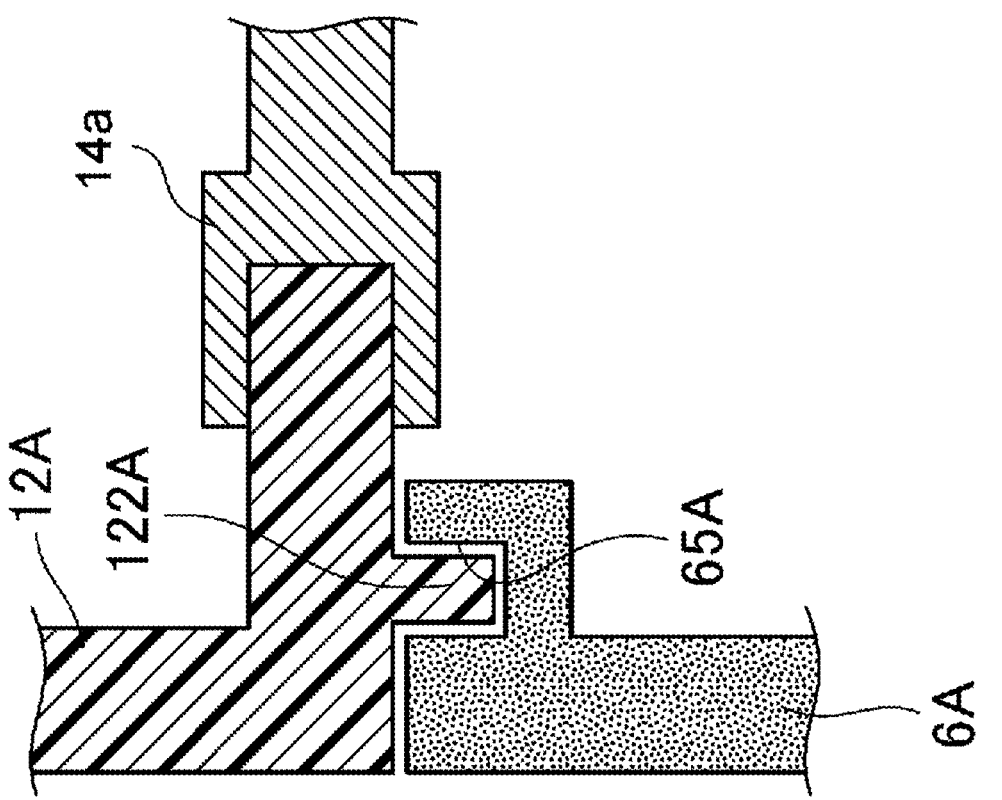

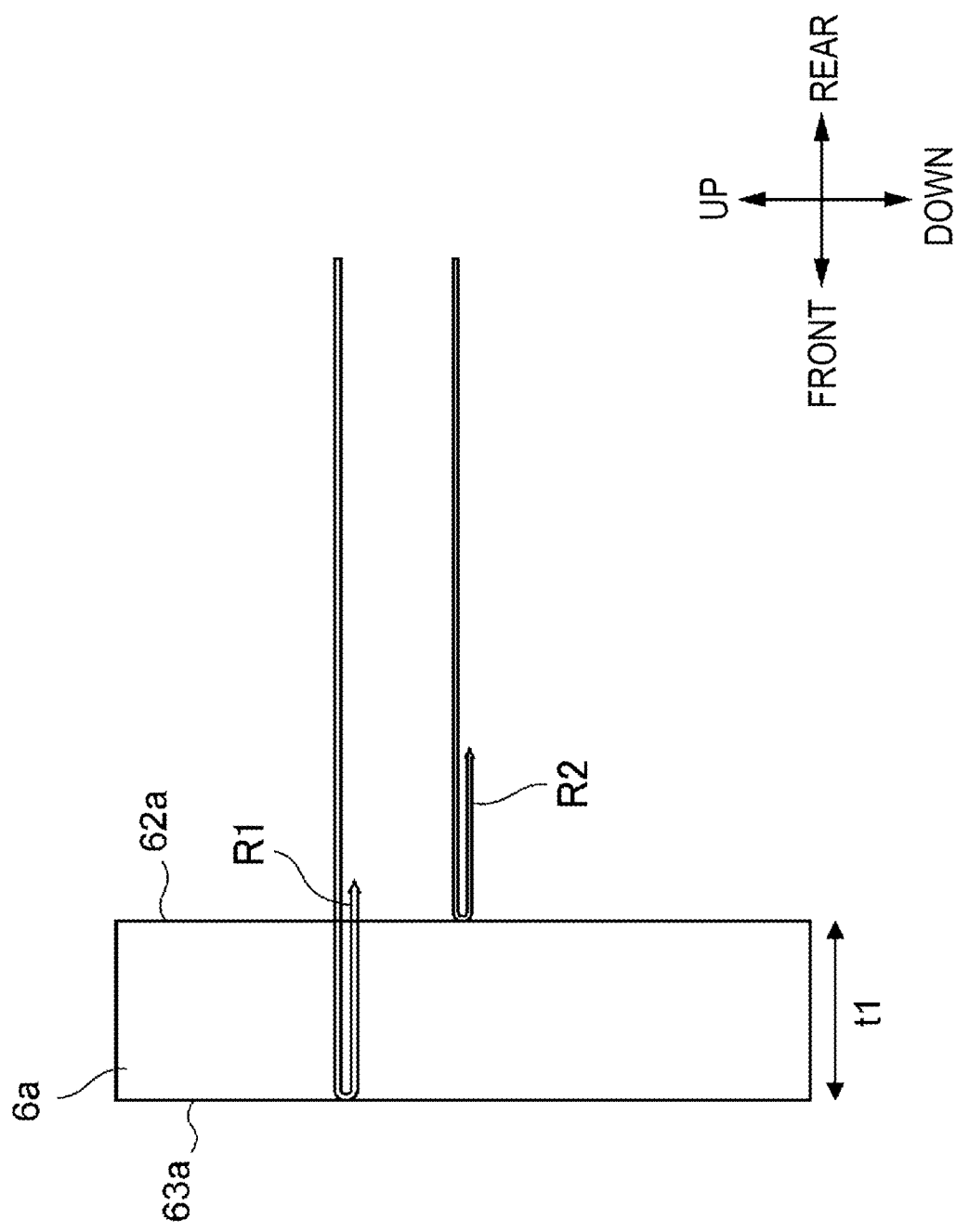

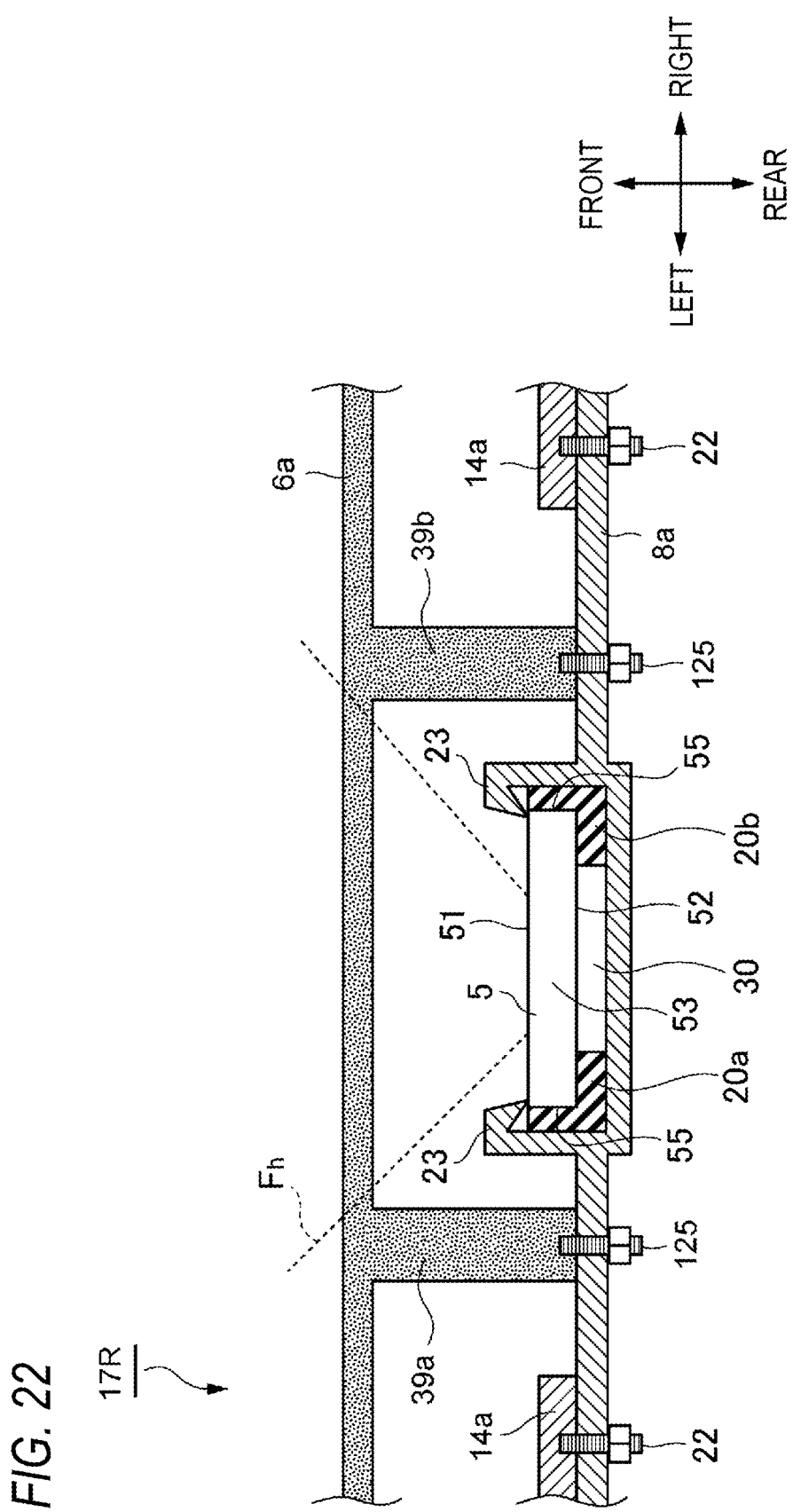

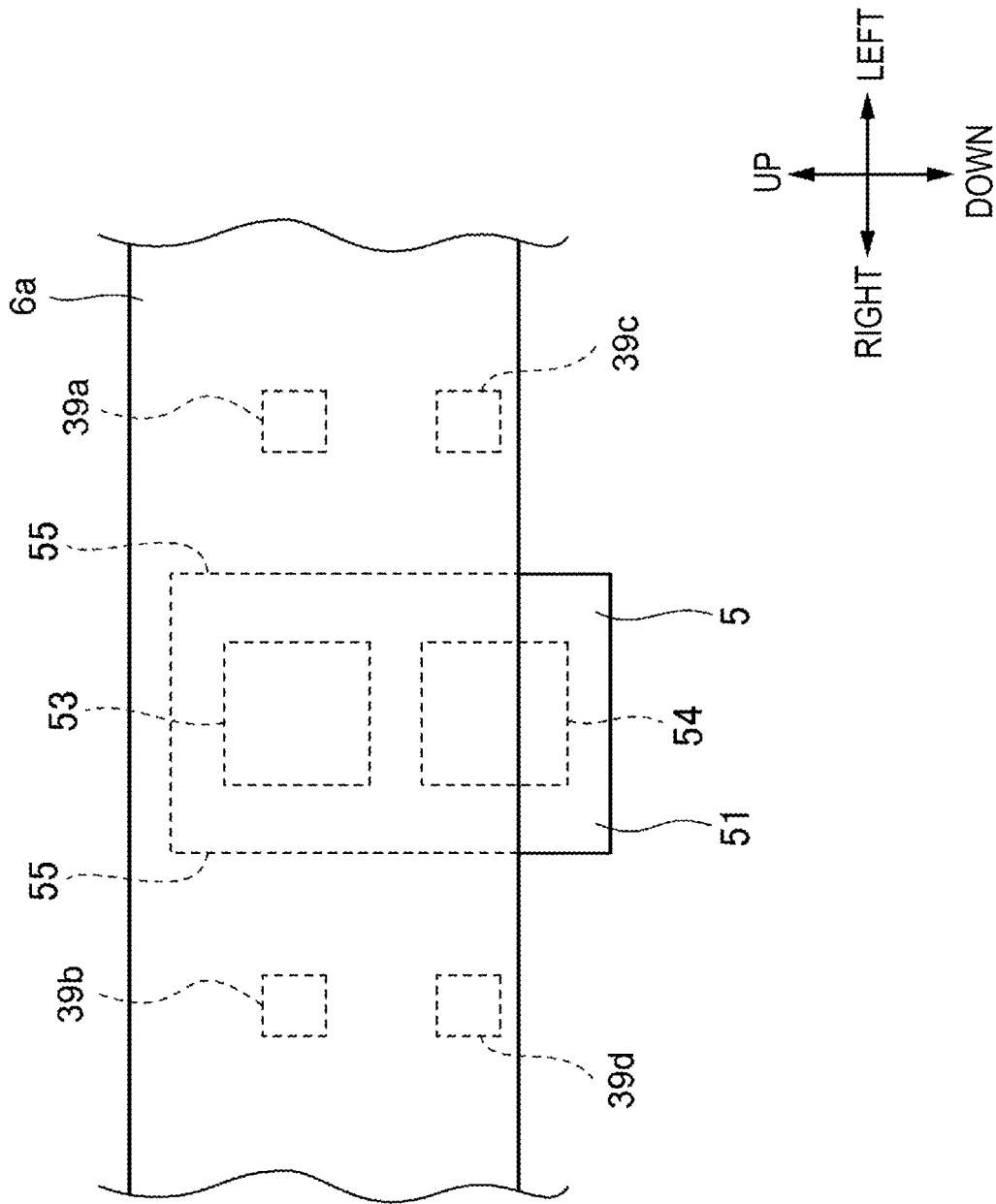

VEHICLE LAMP HAVING RADAR WITH CONCEALING PART AND ELECTROMAGNETIC ABSORBING COVER

The present application incorporates the contents disclosed in Japanese Patent Applications (Japanese Patent Application No. 2019-132826) filed on Jul. 18, 2019, (Japanese Patent Application No. 2019-135290) filed on Jul. 23, 2019, (Japanese Patent Application No. 2019-138204) filed on Jul. 26, 2019, (Japanese Patent Application No. 2019-138205) filed on Jul. 26, 2019, and (Japanese Patent Application No. 2019-138206) filed on Jul. 26, 2019 as appropriate.

TECHNICAL FIELD

The present disclosure relates to a vehicle lamp, a radar module, and a vehicle. In particular, the present disclosure relates to a vehicle lamp, a radar module, and a vehicle on which a radar, such as a millimeter-wave radar and a microwave radar, is mounted.

BACKGROUND ART

There is known a technique for mounting, on a vehicle lamp, a radar, such as a millimeter-wave radar, configured to acquire data indicating surroundings outside a vehicle (for example, see Patent Literature 1). According to Patent Literature 1, a light guide plate made of a resin is disposed in front of a millimeter-wave radar in order to conceal the millimeter-wave radar disposed in a lamp chamber of a vehicle lamp from the outside of the vehicle. In addition, by letting light emitted from a light source into the light guide plate, emission of light from the light guide plate can be visually recognized from the outside of the vehicle. In this way, the millimeter-wave radar can be concealed from the outside of the vehicle by the light emission from the light guide plate, and an electromagnetic wave from the millimeter-wave radar can be radiated away to the outside of the vehicle from the light guide plate.

CITATION LIST

Patent Literature

Patent Literature 1: JP2008-186741A

SUMMARY OF INVENTION

Technical Problem

However, in the vehicle lamp disclosed in Patent Literature 1, since it is necessary to prepare the light guide plate for concealing the millimeter-wave radar separately, the number of components of the vehicle lamp and the number of processes for assembling the vehicle lamp increase. With regard to this point, there is scope for improving a vehicle lamp including a radar, such as a millimeter-wave radar, and a concealing part for concealing the radar.

A first object of the present disclosure is to provide a vehicle lamp and a vehicle capable of concealing a radar from the outside of a vehicle with reliability of radar data acquired by the radar ensured.

A second object of the present disclosure is to provide a vehicle lamp and a vehicle capable of concealing a radar from the outside of a vehicle with reliability of the radar to radiated heat from the outside ensured.

A third object of the present disclosure is to provide a vehicle lamp, a radar module, and a vehicle capable of concealing a radar from the outside of a vehicle and relatively easy and reliable positioning of the radar to the vehicle.

Solution to Problem

According to an aspect of the present disclosure, a vehicle lamp includes:
 a lamp housing;
 a lamp cover covering an opening of the lamp housing;
 an illumination unit disposed in a lamp chamber formed by the lamp housing and the lamp cover;
 a radar configured to acquire radar data indicating surroundings of a vehicle by emitting an electromagnetic wave outside the vehicle; and
 a concealing part that faces the radar to conceal the radar from the outside of the vehicle and is configured to let the electromagnetic wave emitted from the radar through.

The concealing part is formed integrally with the lamp cover, and a boundary between the concealing part and the lamp cover is out of a field of view of the radar.

According to the above configuration, the boundary between the concealing part and the lamp cover is out of the field of view of the radar. Therefore, it is possible to prevent an electromagnetic wave in the field of view of the radar from being reflected by the boundary to a receiving antenna of the radar to have ill effects on the radar data. In this way, it is possible to provide a vehicle lamp capable of concealing a radar from the outside of a vehicle with reliability of radar data acquired by the radar mounted on the vehicle lamp ensured.

According to an aspect of the present disclosure, a vehicle lamp includes:
 a lamp housing;
 a lamp cover covering an opening of the lamp housing;
 an illumination unit disposed in a lamp chamber formed by the lamp housing and the lamp cover;
 a radar configured to acquire radar data indicating surroundings of a vehicle by emitting an electromagnetic wave outside the vehicle;
 a concealing part that faces the radar to conceal the radar from the outside of the vehicle and is configured to let the electromagnetic wave emitted from the radar through; and
 a support member configured to support the radar.

The radar includes: a front surface; and a rear surface on a side opposite to the front surface.

A thermal insulation layer having a thermal conductivity lower than the support member is provided between the support member and the rear surface of the radar.

According to the above configuration, since a thermal insulation layer is provided between the support member and the rear surface of the radar, heat radiated from an external heat source, such as an engine, is less transferred to the rear surface of the radar via the support member. Therefore, it is possible to suitably prevent operation performance of the radar (particularly, a communication circuit part) from declining due to the heat radiated from the external heat source. In this way, it is possible to provide a vehicle lamp capable of concealing a radar from the outside of a vehicle with reliability of the radar to heat radiated from the outside.

According to an aspect of the present disclosure, a vehicle lamp includes:

a lamp housing;

a lamp cover covering an opening of the lamp housing;

an illumination unit disposed in a lamp chamber formed by the lamp housing and the lamp cover;

a radar configured to acquire radar data indicating surroundings of a vehicle by emitting an electromagnetic wave outside the vehicle;

a concealing part that faces the radar to conceal the radar from the outside of the vehicle and is configured to let the electromagnetic wave emitted from the radar through; and an electromagnetic-wave absorption cover surrounding an antenna part of the radar to absorb the electromagnetic wave emitted from the radar.

According to the above configuration, an electromagnetic-wave absorption cover configured to absorb an electromagnetic wave emitted from the radar surrounds the antenna part of the radar. Therefore, it is possible to prevent an electromagnetic wave in a field of view of the radar from being reflected by the concealing part or another optical component to the radar to have ill effects on the radar data. In this way, it is possible to provide a vehicle lamp capable of concealing a radar from the outside of the vehicle with reliability of radar data acquired by the radar mounted on the vehicle lamp ensured.

According to an aspect of the present disclosure, a vehicle lamp includes:

a lamp housing;

a lamp cover covering an opening of the lamp housing;

an illumination unit disposed in a lamp chamber formed by the lamp housing and the lamp cover;

a radar configured to acquire radar data indicating surroundings of a vehicle by emitting an electromagnetic wave outside the vehicle;

a concealing part that faces the radar to conceal the radar from the outside of the vehicle and is configured to let the electromagnetic wave emitted from the radar through; and a positioning part configured to touch the radar to position the radar to the concealing part.

The concealing part is formed integrally with the lamp cover.

The positioning part is formed integrally with the concealing part and is between the concealing part and the radar.

According to the above configuration, the position of the radar to the concealing part is determined by the positioning part formed integrally with the concealing part, and the concealing part is formed integrally with the lamp cover. As described above, when the vehicle lamp is positioned to the vehicle, the radar is also positioned to the vehicle. Therefore, it is possible to provide a vehicle lamp capable of concealing a radar from the outside of a vehicle and relatively easy and reliable positioning of the radar to the vehicle.

According to an aspect of the present disclosure, a vehicle lamp includes:

a lamp housing;

a lamp cover covering an opening of the lamp housing;

an illumination unit disposed in a lamp chamber formed by the lamp housing and the lamp cover;

a radar configured to acquire radar data indicating surroundings of a vehicle by emitting an electromagnetic wave outside the vehicle;

a concealing part that faces the radar to conceal the radar from the outside of the vehicle and is configured to let the electromagnetic wave emitted from the radar through;

a support member configured to support and fix the radar; and a positioning part configured to touch the support member to position the support member to the concealing part.

The concealing part is formed integrally with the lamp cover.

The positioning part is formed integrally with the concealing part and is between the concealing part and the support member.

According to the above configuration, the support member is positioned to the concealing part by the positioning part formed integrally with the concealing part, the concealing part is formed integrally with the lamp cover, and the radar is fixed and supported by the support member. In this way, when the vehicle lamp is positioned to the vehicle, the radar is also positioned to the vehicle. Therefore, it is possible to provide a vehicle lamp capable of concealing a radar from the outside of a vehicle and relatively easy and reliable positioning of the radar to the vehicle.

According to an aspect of the present disclosure, a radar module includes:

a radar that is attachable to a vehicle lamp and is configured to acquire radar data indicating surroundings of a vehicle by emitting an electromagnetic wave outside the vehicle;

a concealing part that faces the radar to conceal the radar from the outside of the vehicle and is configured to let the electromagnetic wave emitted from the radar through; and a support member configured to support and fix the radar.

At least one of the concealing part and the support member includes a positioning part configured to position the radar module to the vehicle lamp.

According to the above configuration, at least one of the concealing part and the support member includes a positioning part configured to position the radar module to the vehicle lamp. In this way, the radar module can be positioned to the vehicle lamp by the positioning part. If the vehicle lamp has been positioned to the vehicle the radar is positioned to the vehicle when the radar module is positioned to the vehicle lamp. Therefore, it is possible to provide the radar module capable of concealing a radar from the outside of a vehicle and relatively easy and reliable positioning of the radar to the vehicle.

Advantageous Effects of Invention

According to the present disclosure, it is possible to provide a vehicle lamp and a vehicle capable of concealing a radar from the outside of a vehicle with reliability of radar data acquired by the radar ensured.

According to the present disclosure, it is possible to provide a vehicle lamp and a vehicle capable of concealing a radar from the outside of a vehicle with reliability of the radar to radiated heat from the outside ensured.

According to the present disclosure, it is possible to provide a vehicle lamp, a radar module, and a vehicle capable of concealing a radar from the outside of a vehicle and relatively easy and reliable positioning of the radar to the vehicle.

BRIEF DESCRIPTION OF DRAWINGS

FIG. 19 is a cross sectional view of the right vehicle lamp and a right radar module in the vertical direction.

FIG. 20 is an enlarged view around a positioning part according to a modification.

FIG. 21 is a diagram showing the reflected electromagnetic waves reflected by a concealing part.

FIG. 22 is a cross sectional view of the right radar module in the horizontal direction.

FIG. 23 is a front view showing the positioning part, the radar, and the concealing part.

DESCRIPTION OF EMBODIMENTS

First Embodiment

Figure 1:
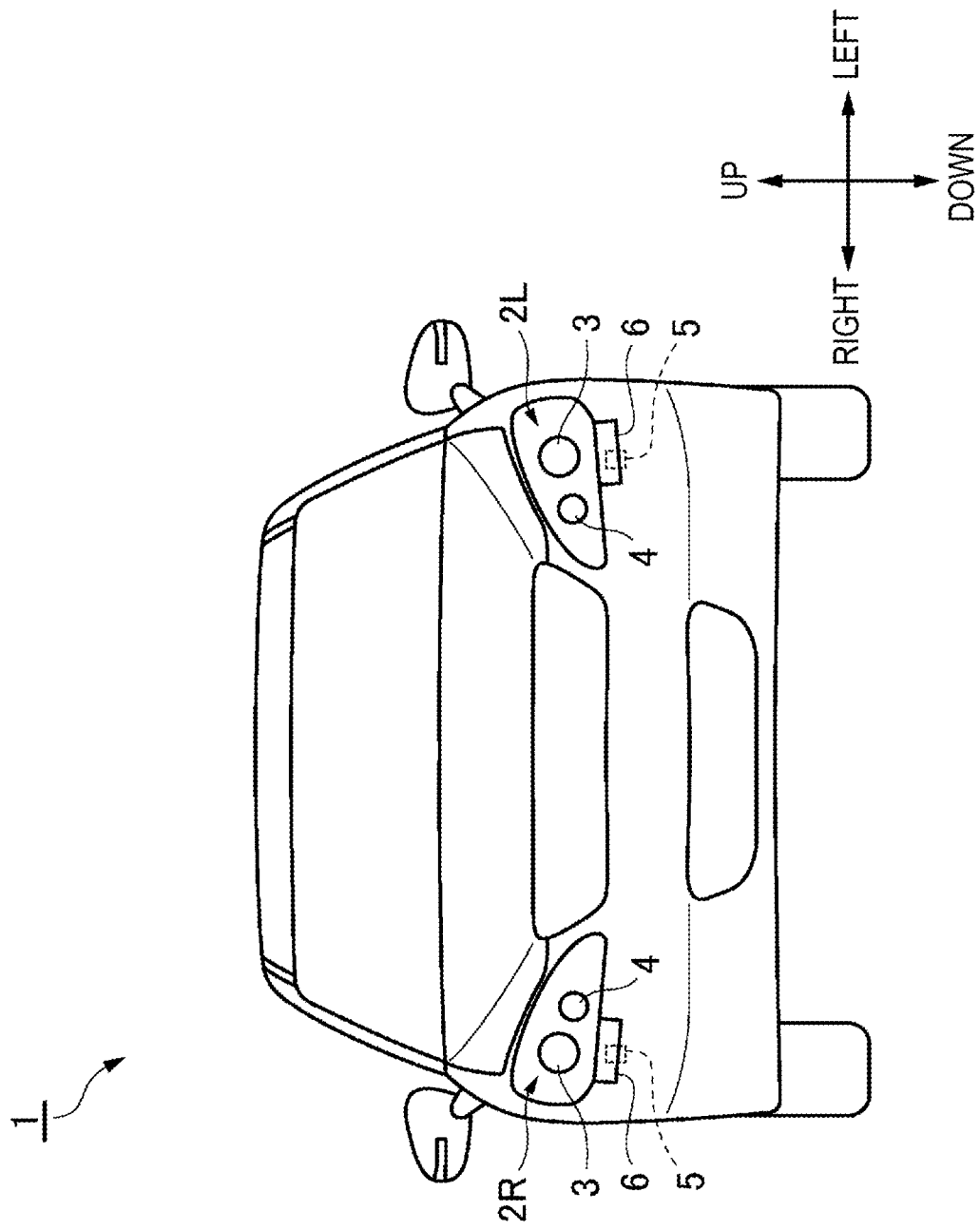
FIG. 1 is a front view of a vehicle including a left vehicle lamp and a right vehicle lamp according to a first embodiment.

In the following, a first embodiment of the present disclosure (hereinafter, simply referred to as "the present embodiment") will be described with reference to the drawings. Dimensions of components shown in the drawings may be different from actual dimensions of the components for the sake of convenience.

In the description of the present embodiment, a "left-right direction," an "up-down direction," and a "front-rear direction" will be referred to as appropriate for the sake of convenience. These directions are relative directions set for a vehicle 1 shown in FIG. 1. The "left-right direction" includes a "left direction" and a "right direction." The "up-down direction" includes an "up direction" and a "down direction." The "front-rear direction" includes a "front direction" and a "rear direction." The "front-rear direction" (not shown in FIG. 1) is perpendicular to the left-right direction and the up-down direction.

In the present embodiment, a "horizontal direction" of the vehicle 1 will be referred to which is perpendicular to the up-down direction (vertical direction) and includes the left-right direction and the front-rear direction. Further, in the present embodiment, directions (left-right direction, up-down direction, and front-rear direction) set for a right vehicle lamp 2R and a left vehicle lamp 2L coincide with directions (left-right direction, up-down direction, and front-rear direction) set for the vehicle 1.

First, the vehicle 1 according to the present embodiment will be described with reference to FIG. 1. FIG. 1 is a front view of the vehicle 1 including a left vehicle lamp 2L and a right vehicle lamp 2R. As shown in FIG. 1, the left vehicle lamp 2L is on a front left side of the vehicle 1, and the right vehicle lamp 2R is on a front right side of the vehicle 1. Each of the left vehicle lamp 2L and the right vehicle lamp 2R includes: a low-beam illumination unit 3; a high-beam illumination unit 4; a radar 5; and a concealing part 6 configured to conceal the radar 5.

In the present embodiment, the left vehicle lamp 2L is similar to the right vehicle lamp 2R. Therefore, in the following, the right vehicle lamp 2R will be described with reference to FIG. 2. For the sake of convenience, the left vehicle lamp 2L and the right vehicle lamp 2R will be generically referred to as a "vehicle lamp 2" simply.

The low-beam illumination unit 3 is configured to emit a low-beam light distribution pattern toward the front of the vehicle 1. The high-beam illumination unit 4 is configured to emit a high-beam light distribution pattern toward the front of the vehicle 1.

The radar 5 is configured to acquire radar data indicating surroundings of the vehicle 1 by emitting an electromagnetic wave (for example, a millimeter wave and a microwave) outside the vehicle 1. The radar 5 is, for example, a millimeter-wave radar or a microwave radar. A vehicle control unit (in-vehicle computer, not shown) is configured to catch the surroundings of the vehicle 1 (in particular, information on an object outside the vehicle 1) based on the radar data output from the radar 5.

Figure 5B:
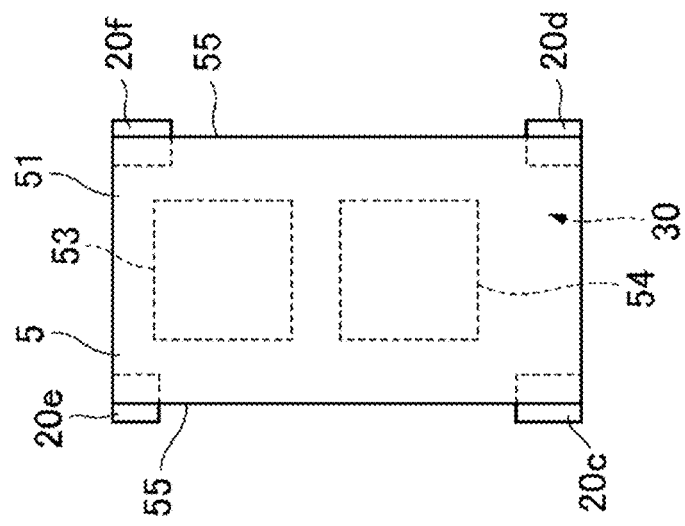
FIG. 5B is a front view showing only a spacer and a radar according to a modification.
Figure 5A:
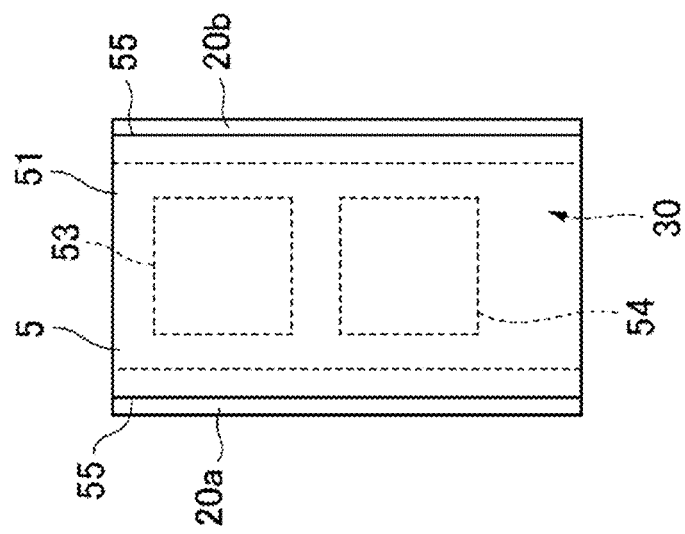
FIG. 5A is a front view showing only a spacer and the radar according to the present embodiment.

The radar 5 includes an antenna part 53 and a communication circuit part 54 (see FIG. 5A). The antenna part 53 includes: one or more transmission antennae configured to emit an electromagnetic wave (for example, a millimeter wave having a wavelength of 1 mm to 10 mm) to the air; and one or more receiving antennae configured to receive a reflected electromagnetic wave reflected by an object. The antenna part 53 may be configured with a patch antenna (a metal pattern formed on a substrate). An emitted electromagnetic wave emitted from the transmission antennae are reflected by an object, such as another vehicle, and then the reflected electromagnetic wave from the object is received by the receiving antennae.

The communication circuit part 54 includes: a transmission radio frequency (RF) circuit; a receiving RF circuit; and a signal processing circuit. The communication circuit part is configured with a monolithic microwave integrated circuit (MIMIC). The transmission RF circuit is electrically connected to the transmission antennae. The receiving RF circuit is electrically connected to the receiving antennae. The signal processing circuit is configured to generate radar data by processing a digital signal output from the receiving RF circuit.

The antenna part 53 and the communication circuit part 54 may be accommodated in a case. The antenna part 53 may be covered with a radome.

The concealing part 6 faces the radar 5 to conceal the radar 5 from the outside of the vehicle 1. The concealing part 6 is configured to let an electromagnetic wave emitted from the radar 5 through. The concealing part 6 may be configured with, for example, an opaque resin member. In particular, the concealing part 6 may be configured with a resin member colored in a predetermined color, such as black. The concealing part 6 may be configured with a reflex reflector having a large number of fine prisms. In this case, since light from the outside is totally reflected by the prisms of the reflex reflector, the radar 5 can be concealed from the outside by the reflex reflector. Therefore, the radar 5 can be concealed from the outside of the vehicle 1 by the concealing part 6, thereby improving exterior design of the right vehicle lamp 2R.

Figure 2:
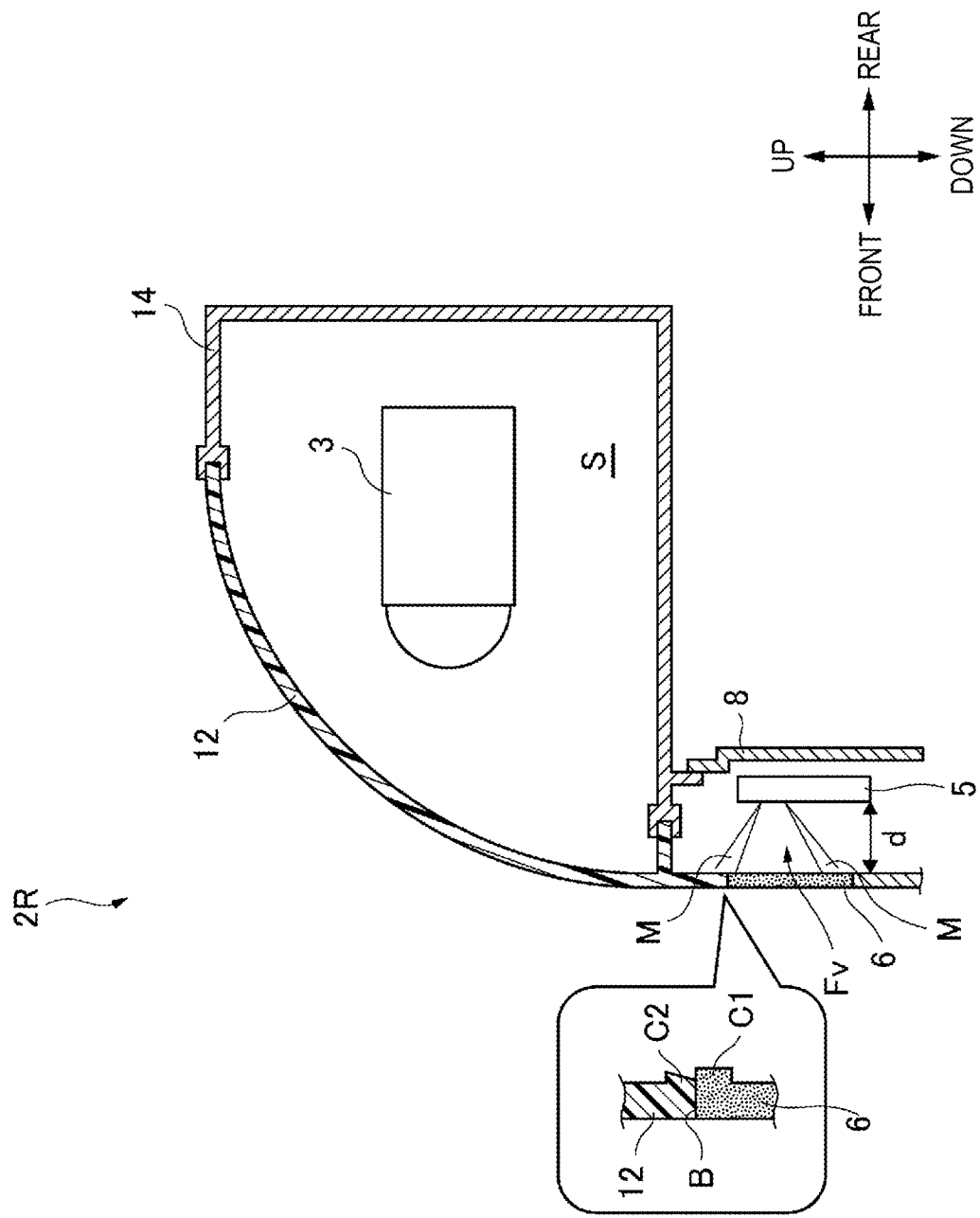
FIG. 2 is a cross sectional view of the right vehicle lamp in a vertical direction.

FIG. 2 is a cross sectional view of the right vehicle lamp 2R in the vertical direction (up-down direction). As shown in FIG. 2, the right vehicle lamp 2R further includes: a lamp housing 14; a lamp cover 12 covering an opening of the lamp housing 14; and a support member 8. The lamp housing 14 may be configured with, for example, a metal member. The lamp cover 12 may be configured with, for example, a transparent resin member. The low-beam illumination unit 3 and the high-beam illumination unit 4 are in a lamp chamber S formed by the lamp housing 14 and the lamp cover 12.

In the present embodiment, instead of the high-beam illumination unit 4, an adaptive driving beam (ADB) illumination unit configured to emit an ADB light distribution pattern having an irradiation region and a non-irradiation region may be disposed in the lamp chamber S. In addition, a LiDAR unit or a camera may be disposed in the lamp chamber S. The support member 8 is a metal bracket and is configured to support and fix the radar 5. The support member 8 is fixed to the lamp housing 14 with screws 22 (see FIG. 4). The support member 8 extends downward from the lamp housing 14. Since the radar 5 and the support member 8 are outside the lamp chamber S, operation of the radar 5 is suitably prevented from being affected by heat generated from the low-beam illumination unit 3 and the high-beam illumination unit 4.

The concealing part 6 is formed integrally with the lamp cover 12 and extends downward from the lamp cover 12. Since the concealing part 6 is integrally formed with the lamp cover 12 to obviate the necessity for attaching the concealing part 6 to the right vehicle lamp 2R, the number of processes for assembling the right vehicle lamp 2R can be reduced. The concealing part 6 and the lamp cover 12 may be integrally formed by two-tone molding using a mold. If the concealing part 6 and the lamp cover 12 are integrally formed by two-tone molding, protrusions C1 and C2 are formed on the concealing part 6 and the lamp cover 12 around a boundary B between the concealing part 6 and the lamp cover 12. Therefore, in the present embodiment, a relative position between the concealing part 6 and the radar 5 is adjusted such that the boundary B between the concealing part 6 and the lamp cover 12 is out of a field of view Fv of the radar 5 in the vertical direction.

In this way, since the boundary B between the concealing part 6 and the lamp cover 12 is out of the field of view Fv of the radar 5, it is possible to prevent an electromagnetic wave in the field of view Fv of the radar 5 from being reflected by the protrusions C1 and C2 to the receiving antennae of the radar 5 to have ill effects on the radar data. Therefore, it is possible to conceal the radar 5 from the outside of the vehicle 1 with reliability of radar data acquired by the radar 5 mounted on the right vehicle lamp 2R ensured.

A field of view Fh (see FIG. 4) of the radar 5 in the horizontal direction may be, for example, within a range of 120° to 180°. In other words, the field of view Fh of the radar 5 may be within a range of ±60° to ±90° with respect to a center axis of the radar 5. The field of view Fv of the radar 5 in the vertical direction may be, for example, within a range of 3° to 100°. The field of view of the radar 5 is synonymous with a detection range of the radar 5.

As shown in FIG. 2, angular regions adjacent to both ends of the field of view Fv of the radar 5 are defined as margin angular region M. While intensity of electromagnetic waves in the margin angular region M is sufficiently smaller than in the field of view Fv, metal members reflecting the electromagnetic waves cannot be disposed in the margin angular region M. The margin angular region M may be, for example, within a range of 3° to 5°. In the present embodiment, the boundary B between the concealing part 6 and the lamp cover 12 is out of the field of view Fv but may be within the margin angular region M.

Even if the boundary B is within the margin angular region M, intensity of electromagnetic waves in the margin angular region M is weak, and thus, intensity of the reflected electromagnetic waves reflected by the boundary B is sufficiently weak. Therefore, even if the reflected electromagnetic waves enter the receiving antenna of the radar 5, radar data is not affected by the reflected electromagnetic waves. In this way, for example, when the illumination units and the radar 5 are close to each other, a region of the concealing part 6 can be made as small as possible.

In relation to the relative position between the radar 5 and the concealing part 6, a distance d between the concealing part 6 and the radar 5 in the front-rear direction may be from 20 mm to 100 mm. If the distance d between the concealing part 6 and the radar 5 is not smaller than 20 mm, the reflected electromagnetic waves emitted from the radar 5 and reflected by the concealing part 6 are sufficiently weakened before reaching the receiving antennae of the radar 5. Therefore, it is possible to prevent the reflected electromagnetic waves received by the radar 5 from affecting radar data as noise.

On the other hand, if the distance between the concealing part 6 and the radar 5 is not greater than 100 mm, it is possible to prevent some electromagnetic waves in the field of view of the radar 5 from being unable to pass through the concealing part 6. That is, it is possible to prevent some electromagnetic waves unable to pass through the concealing part 6 from being reflected by the boundary B between the concealing part 6 and the lamp cover 12 or by another optical component to have ill effects on the radar data as noise.

Figure 3:
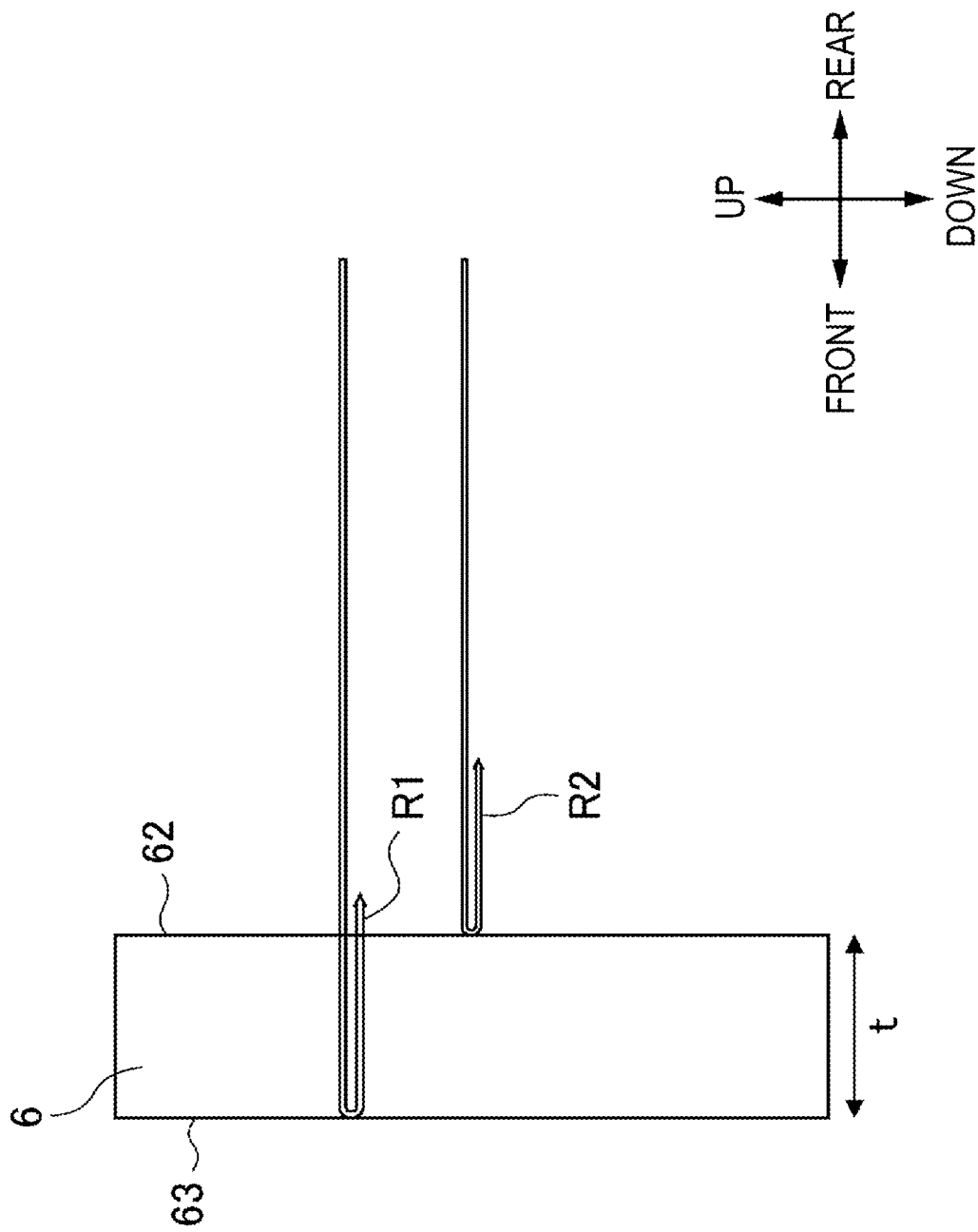
FIG. 3 is a diagram showing reflected electromagnetic waves reflected by a concealing part.

Next, a thickness t of the concealing part 6 in the front-rear direction will be described with reference to FIG. 3. FIG. 3 is a diagram showing reflected electromagnetic waves R1 and R2 reflected by the concealing part 6. The thickness t of the concealing part 6 shown in FIG. 3 follows the following equation (1);

[Equation 1]

$$t = \frac{\lambda}{2\sqrt{\varepsilon_r}} \times n, \quad (1)$$

where λ is a wavelength of an electromagnetic wave emitted from the radar 5, $\varepsilon_r$ is relative permittivity of the concealing part 6, and n is a positive integer.

If the thickness t of the concealing part 6 follows the above equation (1), the reflected electromagnetic wave R2 reflected by one surface 62 of the concealing part 6 facing the radar 5 and the reflected electromagnetic wave R1 reflected by the other surface 63 of the concealing part 6 on a side opposite to the one surface 62 weaken each other. Specifically, since a phase difference Δθ between the reflected electromagnetic waves R2 and R1 is (2 m+1)π (where m is a non-negative integer), the reflected electromagnetic waves R1 and R2 weaken each other. As a result, it is possible to reduce a reflectance of the concealing part 6 to an electromagnetic wave emitted from the radar 5. Therefore, since intensity of a reflected electromagnetic wave reflected by the concealing part 6 becomes weak, it is possible to prevent a reflected electromagnetic wave received by the radar 5 from affecting radar data as noise. For example, when the wavelength λ of the electromagnetic wave of the radar 5 is 3.922 mm, the relative permittivity $\varepsilon_r$ of the concealing part 6 is 2, and n=1, the thickness t of the concealing part 6 is 1.386 mm.

Figure 4:
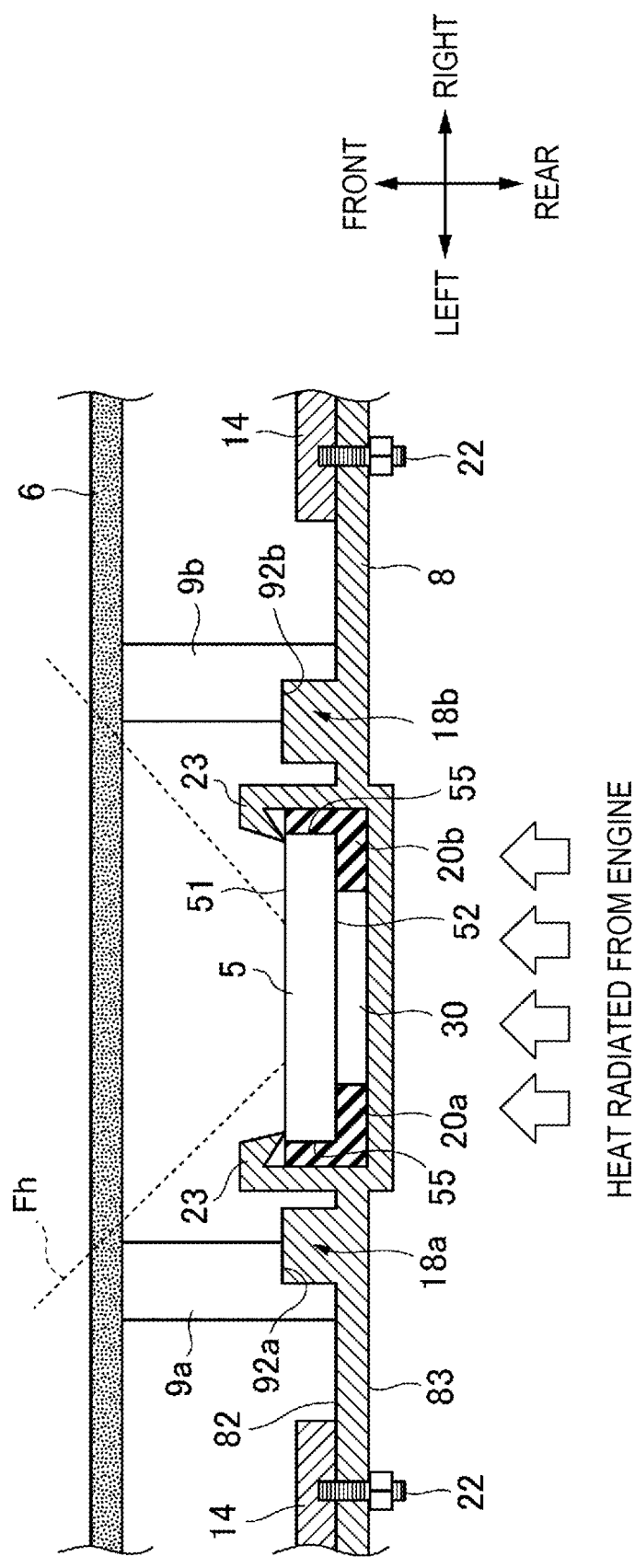
FIG. 4 is a cross sectional view showing a radar, a support member, and the concealing part in a horizontal direction.

Next, the radar 5, the support member 8, and the concealing part 6 will be specifically described with reference mainly to FIG. 4. FIG. 4 is a cross sectional view showing the radar 5, the support member 8, and the concealing part 6 in the horizontal direction. As shown in FIG. 4, the support member 8 is fixed to the lamp housing 14 with the screws 22 as fixing units. The radar 5 is supported and fixed by a lance 23 provided in the support member 8. The radar 5 includes: a front surface 51; a rear surface 52 on a side opposite to the front surface 51; and side surfaces 55 between the front surface 51 and the rear surface 52. The front surface 51, the rear surface 52, and the side surfaces 55 of the radar 5 may be a front surface, a rear surface, and side surfaces of a case of the radar 5, respectively. An electromagnetic wave emitted from the antenna part 53 (transmission antenna) of the radar 5 are sent out into air via the front surface 51. A reflected electromagnetic wave reflected by an object outside the vehicle 1 enters the antenna part 53 (receiving antenna) via the front surface 51.

Spacers 20a and 20b are provided between the rear surface 52 of the radar 5 and the support member 8. Thermal conductivity of the spacers 20a and 20b may be lower than the support member 8. As shown in FIG. 5A, the spacer 20a (an example of a first spacer) touches the rear surface 52 and the side surface 55 of the radar 5 and extends in the up-down direction along the side surfaces 55 of the radar 5. Similarly, the spacer 20b (an example of a second spacer) touches the rear surface 52 and the side surface 55 of the radar 5 and extends in the up-down direction along the side surfaces 55 of the radar 5. The spacer 20a faces the spacer 20b in the left-right direction (an example of a first direction) across an air layer 30.

In this way, since the two spacers 20a and 20b separated from each other are provided between the radar 5 and the support member 8, the air layer 30 (an example of a thermal insulation layer) can be relatively easily provided between the rear surface 52 of the radar 5 and the support member 8.

According to the present embodiment, since the air layer 30 functioning as a thermal insulation layer is provided between the support member 8 and the rear surface 52 of the radar 5, heat radiated from an engine (external heat source) behind the radar 5 is less transferred to the rear surface 52 of the radar 5 via the support member 8. In this way, it is possible to suitably prevent operation performance of the radar 5 (particularly, communication circuit part 54) from declining due to the heat radiated from the engine. Therefore, it is possible to conceal the radar 5 from the outside of the vehicle 1 with reliability of the radar 5 to heat radiated from the outside ensured.

If the spacers 20a and 20b are not provided between the radar 5 and the support member 8, the rear surface 52 of the radar 5 directly touches the support member 8. In this case, heat radiated from the engine is easily transferred from the support member 8 having a high thermal conductivity to the rear surface 52 of the radar 5, thereby the operation performance of the radar 5 significantly declining due to the heat radiated from the engine.

If the thermal conductivity of the spacers 20a and 20b are lower than the support member 8, heat radiated from the engine is less transferred to the radar 5 via the support member 8. Therefore, the spacers 20a and 20b may be configured with a member having a thermal conductivity lower than the support member 8, which is made of a metal member.

Although the two spacers 20a and 20b are provided in the present embodiment, four spacers 20c to 20f may be provided between the support member 8 and the rear surface 52 of the radar 5 as shown in FIG. 5B. Also, in this case, each of the spacers 20c to 20f touches the rear surface 52 and the side surfaces 55 of the radar 5. Each of the spacers 20c to 20f may be provided correspondingly to one of four corners of the radar 5.

The spacer 20d (an example of the second spacer) faces the spacer 20c (an example of the first spacer) in the left-right direction (an example of the first direction) across the air layer 30. The spacer 20e (an example of a third spacer) faces the spacer 20c in the up-down direction (an example of a second direction) across the air layer 30. The spacer 20f (an example of a fourth spacer) faces the spacer 20d in the up-down direction across the air layer 30 and faces the spacer 20e in the left-right direction across the air layer 30.

In this way, by providing the four spacers 20c to 20f shown in FIG. 5B between the support member 8 and the radar 5, it is possible to further increase a contact area between the rear surface 52 of the radar 5 and the air layer 30. Therefore, as compared with FIG. 5B, heat radiated from the engine is less transferred to the radar 5.

As described above, the radar 5 and the concealing part 6 are separated from each other by the distance d (see FIG. 1) in the front-rear direction. The relative position between the radar 5 and the concealing part 6 is determined by positioning parts 9a and 9b. In particular, the positioning part 9a is configured to position the support member 8 to the concealing part 6 with a concave 92a provided in the positioning part 9a engaging with a rib 18a provided on a front surface 82 of the support member 8. Similarly, the positioning part 9b is configured to position the support member 8 to the concealing part 6 with a concave 92b provided in the positioning part 9b engaging with a rib 18b provided on the front surface 82 of the support member 8. The positioning parts 9a and 9b are formed integrally with the concealing part 6 and are between the concealing part 6 and the radar 5. The positioning part 9a faces the positioning part 9b across the radar 5 in the left-right direction.

In this way, since the support member 8 is positioned to the concealing part 6 by the two positioning parts 9a and 9b, when the vehicle lamp 2 is positioned to the vehicle 1, the radar 5 is also positioned to the vehicle 1. Therefore, the radar 5 can be relatively easily and reliably positioned to the vehicle 1 by the positioning parts 9a and 9b.

First Modification

Next, a support member 8a according to a modification will be described with reference to FIG. 6. According to the support member 8a of the present modification, it is possible to provide an air layer 30a between the support member 8a and the rear surface 52 of the radar 5 without a spacer.

Figure 6:
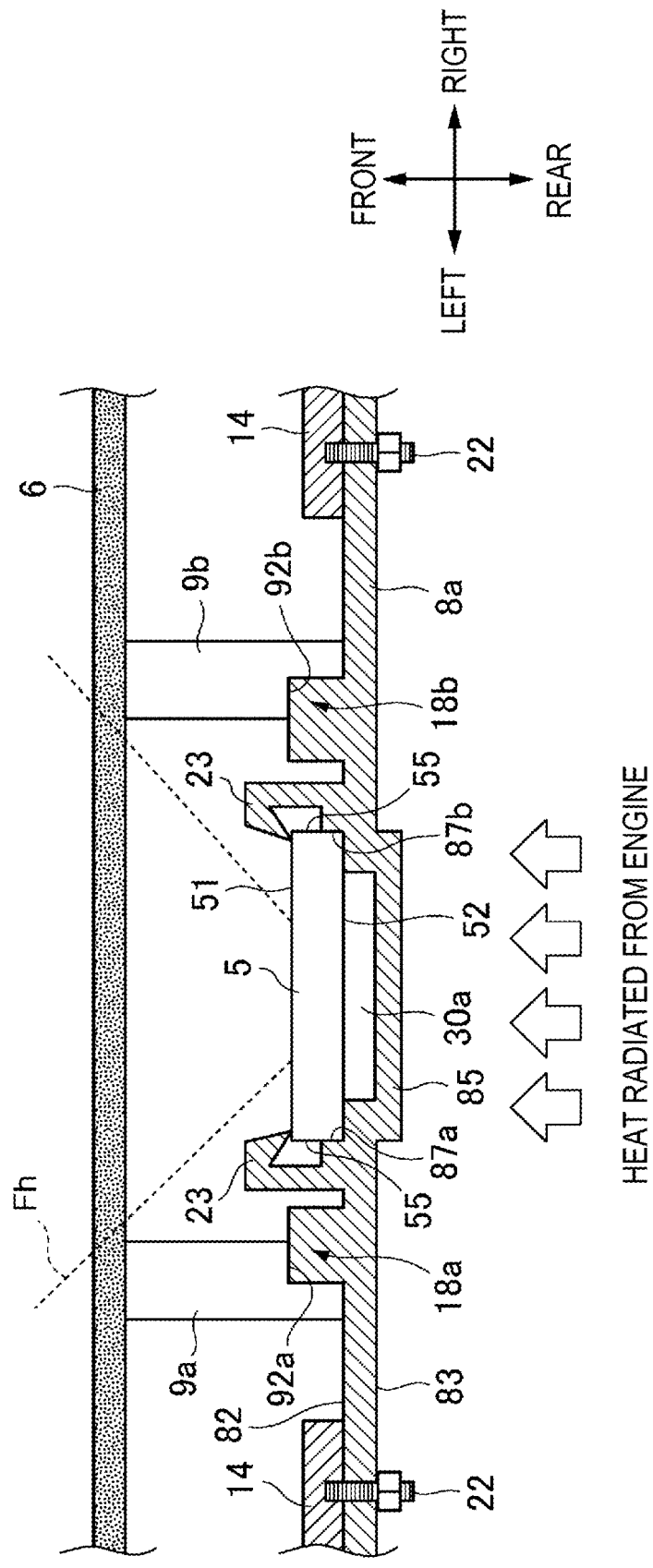
FIG. 6 is a cross sectional view showing the radar, the support member, and the concealing part in the horizontal direction.

As shown in FIG. 6, the rear surface 52 of the radar 5 directly touches the front surface 82 of the support member 8a. The support member 8a has a convex 85 protruding from a rear surface 83 on a side opposite to the front surface 82 of the support member 8a. The air layer 30a (an example of the thermal insulation layer) is provided between the rear surface 52 of the radar 5 and the convex 85 facing the rear surface 52. The side surfaces 55 of the radar 5 touch step parts 87a and 87b formed on the support member 8a. The radar 5 can be positioned to the support member 8 with the side surfaces 55 and the rear surface 52 of the radar 5 touching the step parts 87a and 87b.

According to the present modification, the air layer 30a can be relatively easily provided between the support member 8a and the rear surface 52 of the radar 5 by the convex 85 of the support member 8a. In particular, it is possible to provide the air layer 30a between the rear surface 52 and the support member 8a without additional components, such as a spacer.

Second Modification

Figure 7:
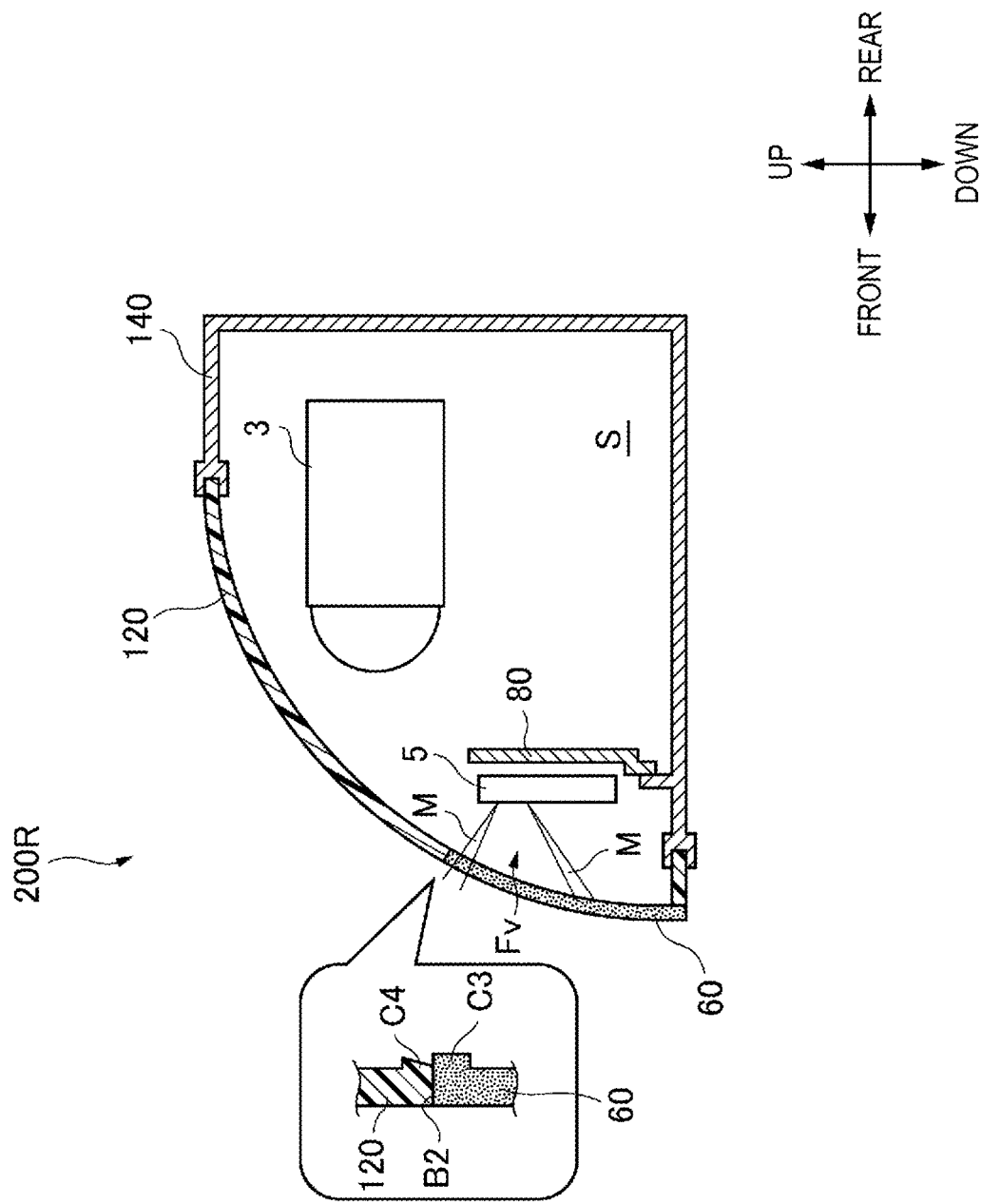
FIG. 7 is a cross sectional view of a right vehicle lamp according to a second modification of the first embodiment in the vertical direction.

Next, a right vehicle lamp 200R according to a modification will be described with reference to FIG. 7. FIG. 7 is a cross sectional view of the right vehicle lamp 200R according to the modification in the vertical direction. The right vehicle lamp 200R according to the modification is mainly different from the right vehicle lamp 2R according to the present embodiment in that the radar 5 and a support member 80 are in the lamp chamber S.

As shown in FIG. 7, the right vehicle lamp 200R includes: a lamp housing 140; a lamp cover 120 covering an opening of the lamp housing 140; the low-beam illumination unit 3 disposed in the lamp chamber S formed by the lamp housing 140 and the lamp cover 120; and a high-beam illumination unit (not shown). The right vehicle lamp 200R further includes: the radar 5; the support member 80 that is fixed to the lamp housing 140 and supports and fixes the radar 5; and a concealing part 60 facing the radar 5 to conceal the radar 5 from the outside of the vehicle 1.

The concealing part 60 is formed integrally with the lamp cover 120 and extends downward from the lamp cover 120. The concealing part 60 and the lamp cover 120 may be integrally formed by two-tone molding using a mold. If the concealing part 60 and the lamp cover 120 are integrally formed by two-tone molding, protrusions C3 and C4 are formed on the concealing part 60 and the lamp cover 120 around a boundary B2 between the concealing part 60 and the lamp cover 120. Therefore, in the present modification, a relative position between the concealing part 60 and the radar 5 is adjusted such that the boundary B2 between the concealing part 60 and the lamp cover 120 is out of the field of view Fv of the radar 5 in the vertical direction.

As described above, since the boundary B2 between the concealing part 60 and the lamp cover 120 is out of the field of view Fv of the radar 5, it is possible to prevent an electromagnetic wave in the field of view Fv of the radar 5 from being reflected by the protrusions C3 and C4 to the receiving antenna of the radar 5 to have ill effects on radar data. Therefore, it is possible to conceal the radar 5 from the outside of the vehicle 1 with reliability of the radar data acquired by the radar 5 mounted on the right vehicle lamp 200R ensured. The boundary B2 between the concealing part 6 and the lamp cover 120 is out of the field of view Fv but may be within the margin angular region M.

According to the present modification, since the radar 5 is in the lamp chamber, it is possible to prevent the right vehicle lamp 200R from getting bigger suitably.

Second Embodiment

In the following, a second embodiment of the present disclosure (hereinafter, simply referred to as "the present embodiment") will be described with reference to the drawings. Dimensions of components shown in the drawings may be different from actual dimensions of the components for the sake of convenience. Detailed description of components having the same reference numerals as in the first embodiment will not be repeated.

Figure 8:
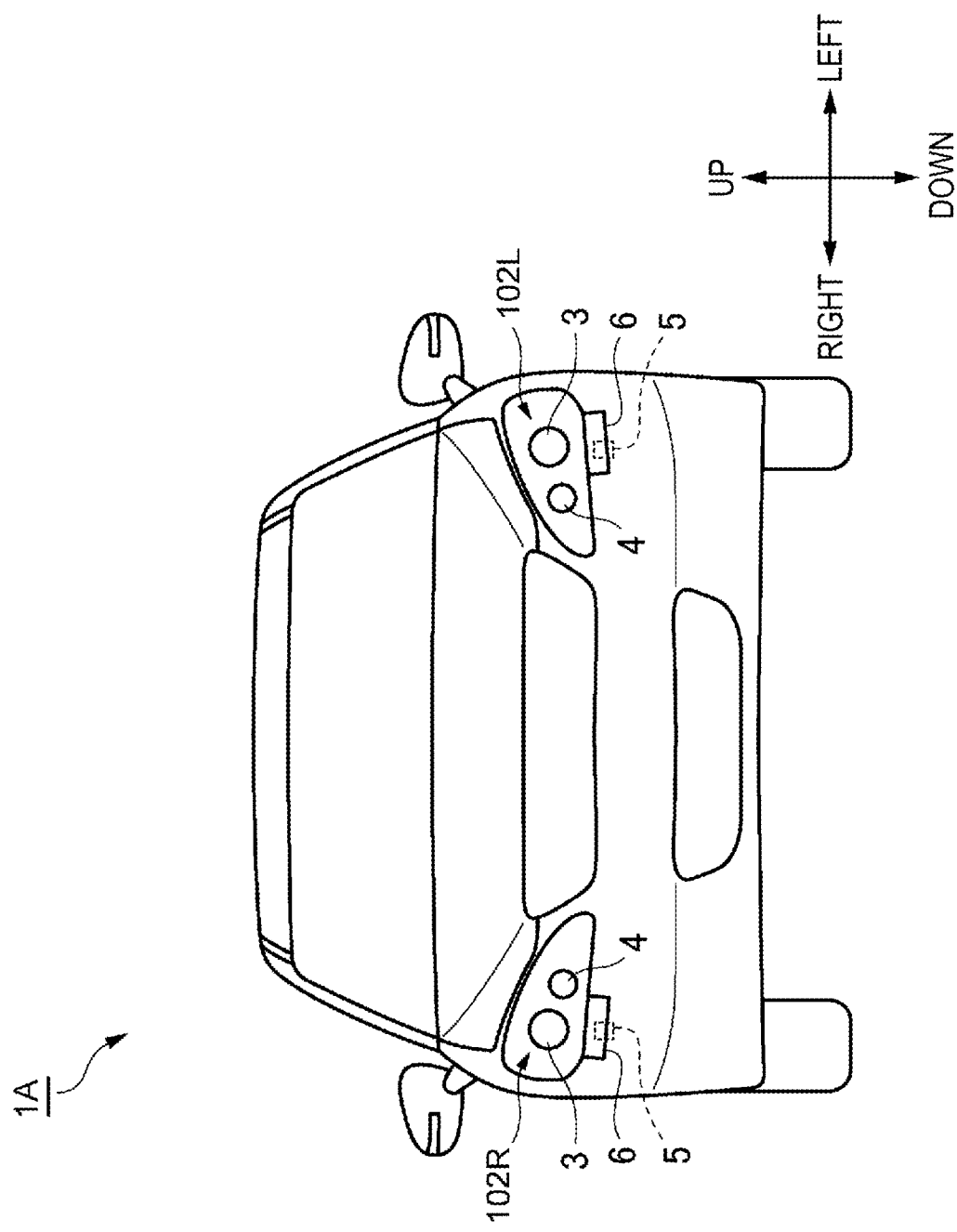
FIG. 8 is a front view of a vehicle including a left vehicle lamp and a right vehicle lamp according to a second embodiment.

First, a vehicle 1A according to the present embodiment will be described with reference to FIG. 8. FIG. 8 is a front view of the vehicle 1A including a left vehicle lamp 102L and a right vehicle lamp 102R. As shown in FIG. 8, the left vehicle lamp 102L is on the front left side of the vehicle 1A, and the right vehicle lamp 102R is on the front right side of the vehicle 1A. Each of the left vehicle lamp 102L and the right vehicle lamp 102R includes: the low-beam illumination unit 3; the high-beam illumination unit 4; the radar 5; and the concealing part 6 configured to conceal the radar 5.

In the present embodiment, the left vehicle lamp 102L is similar to the right vehicle lamp 102R. Therefore, in the following, the right vehicle lamp 102R will be described with reference to FIG. 9. For the sake of convenience, the left vehicle lamp 102L and the right vehicle lamp 102R will be generically referred to as a "vehicle lamp 102" simply.

Figure 9:
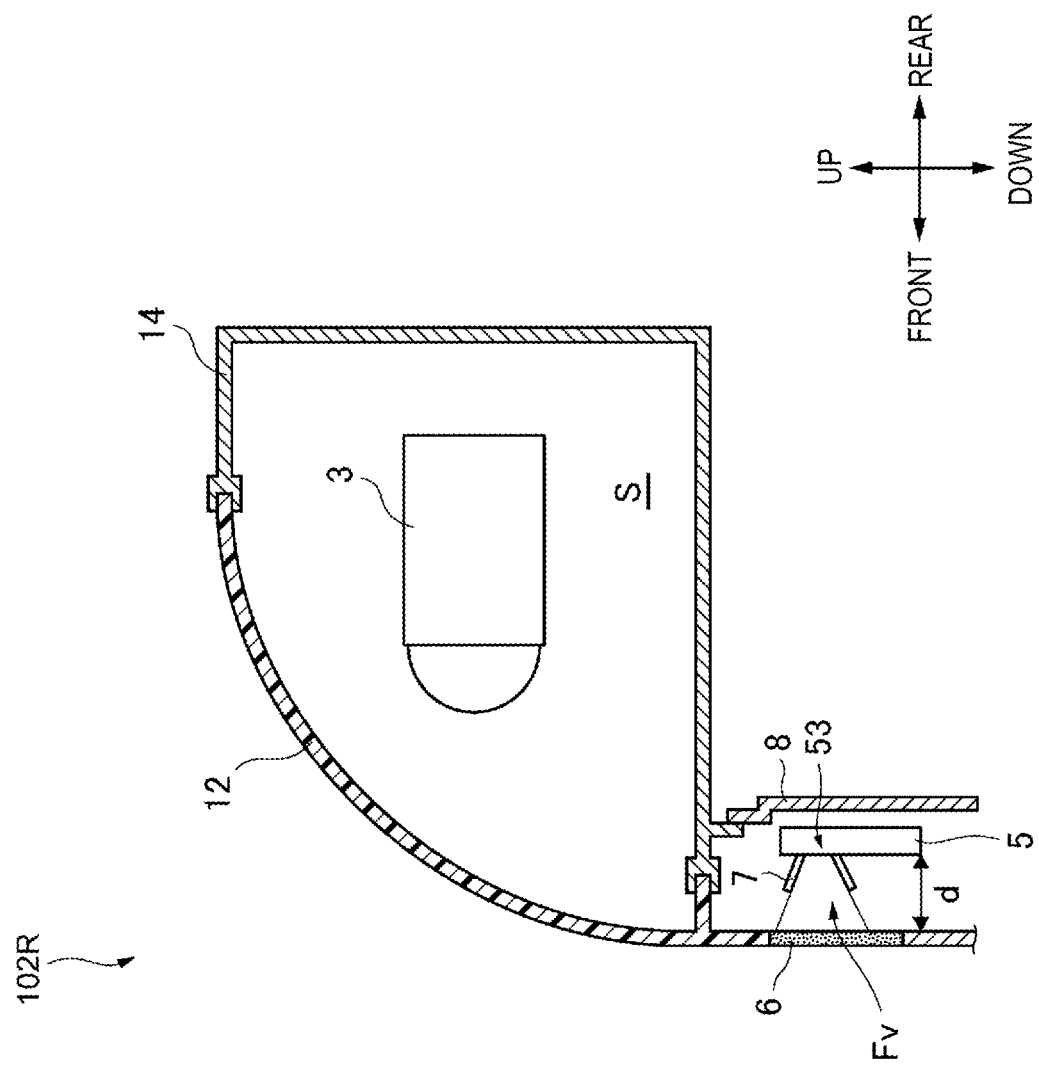
FIG. 9 is a cross sectional view of the right vehicle lamp in the vertical direction.

FIG. 9 is a cross sectional view of the right vehicle lamp 102R in the vertical direction (up-down direction). As shown in FIG. 9, the right vehicle lamp 102R further includes: the lamp housing 14; the lamp cover 12 covering the opening of the lamp housing 14; the support member 8; and an electromagnetic-wave absorption cover 7.

Figure 10:
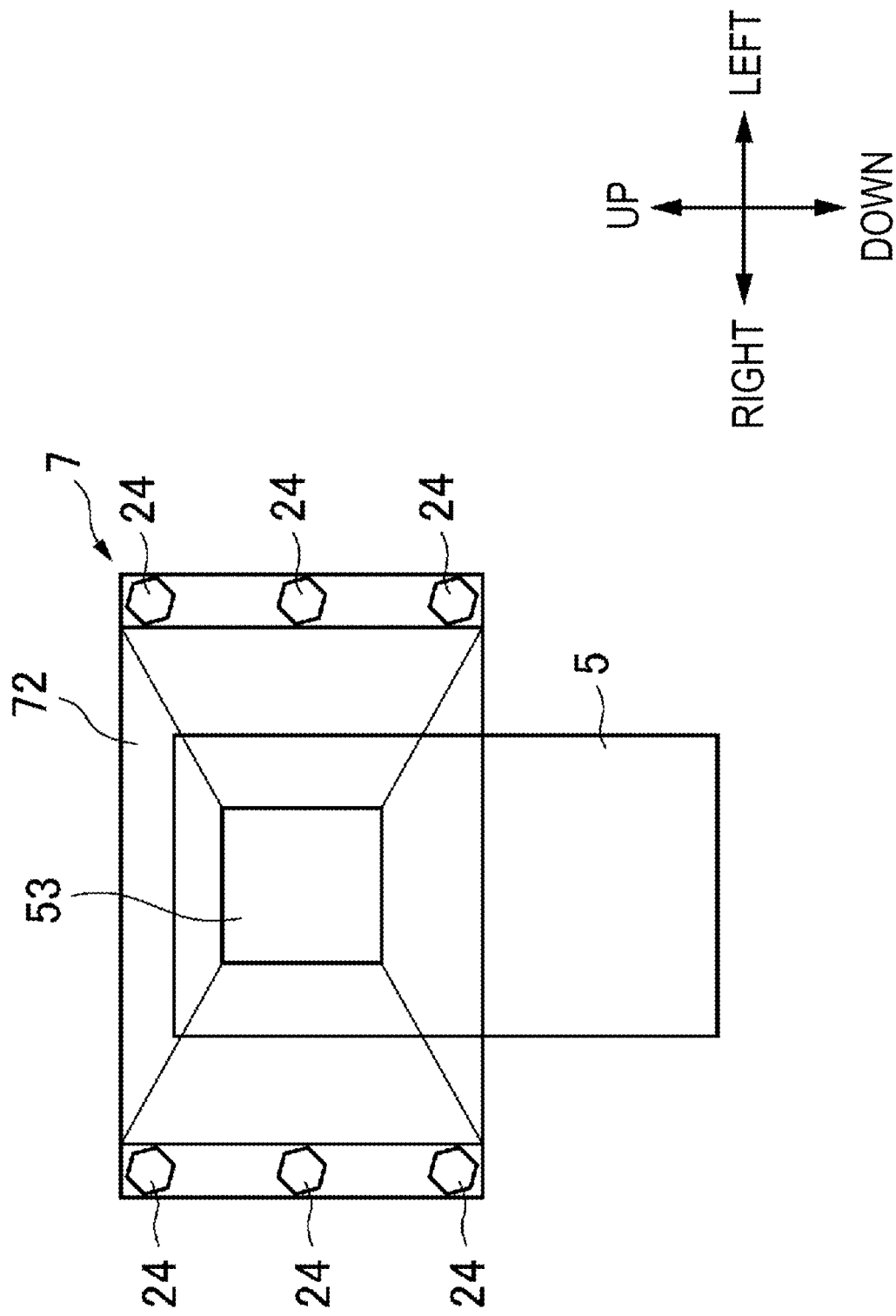
FIG. 10 is a front view showing only an electromagnetic-wave absorption cover and the radar.
Figure 11:
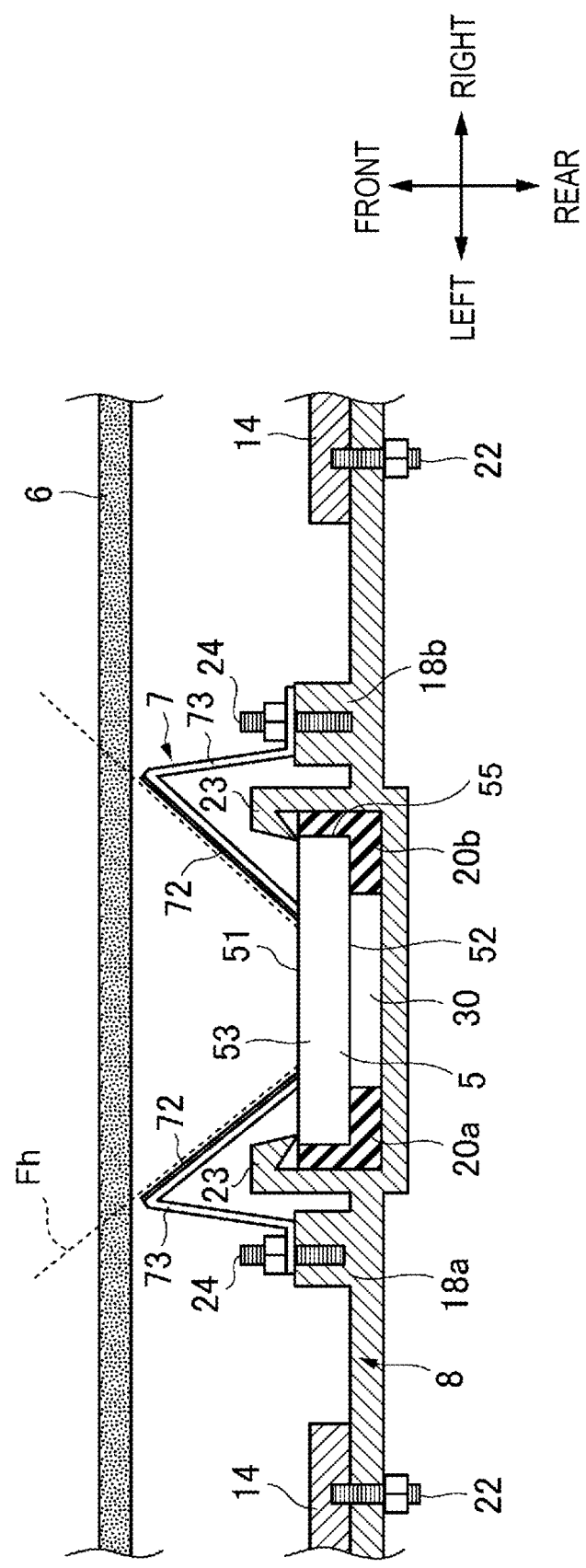
FIG. 11 is a cross sectional view showing the radar, the support member, the concealing part, and the electromagnetic-wave absorption cover in the horizontal direction.

Next, the radar 5, the support member 8, and the electromagnetic-wave absorption cover 7 will be specifically described with reference to FIGS. 10 and 11. FIG. 10 is a front view showing only the electromagnetic-wave absorption cover 7 and the radar 5. FIG. 11 is a cross sectional view showing the radar 5, the support member 8, the concealing part 6, and the electromagnetic-wave absorption cover 7 in the horizontal direction.

As shown in FIG. 11, the support member 8 is fixed to the lamp housing 14 with the screws 22 as fixing units. The radar 5 is supported and fixed by the lance 23 (an example of an elastic engagement member) provided in the support member 8. The radar 5 includes: the front surface 51; the rear surface 52 on the side opposite to the front surface 51; and the side surfaces 55 between the front surface 51 and the rear surface 52. An electromagnetic wave emitted from the antenna part 53 of the radar 5 are sent out into air via the front surface 51.

The spacers 20a and 20b are provided between the radar 5 and the support member 8. The thermal conductivity of the spacers 20a and 20b may be lower than the support member 8. The spacer 20a faces the spacer 20b in the left-right direction. Each of the spacers 20a and 20b touch the rear surface 52 and the side surfaces 55. In this way, since the two spacers 20a and 20b separated from each other are provided between the radar 5 and the support member 8, the air layer 30 (an example of a thermal insulation layer) is provided between the rear surface 52 of the radar 5 and the support member 8.

The electromagnetic-wave absorption cover 7 is configured to absorb an electromagnetic wave emitted from the antenna part 53 of the radar 5. The electromagnetic-wave absorption cover 7 includes: a frustum-shaped cover body 73; and an electromagnetic-wave absorption sheet 72 provided on an inner surface of the cover body 73. The cover body 73 may be formed of, for example, a resin material. The electromagnetic-wave absorption sheet 72 may be formed of: an inorganic binder; and electromagnetic-wave absorption particles provided in the inorganic binder. As the electromagnetic-wave absorption particles, epsilon iron oxide particles or titanium oxide particles may be adopted. If the electromagnetic-wave absorption cover 7 only includes the cover body, the cover body may be formed of a resin material mixed with the electromagnetic-wave absorption particles.

The electromagnetic-wave absorption cover 7 surrounds and is out of the field of view F (the field of view Fh in the horizontal direction and the field of view Fv in the vertical direction) of the radar 5. The electromagnetic-wave absorption cover 7 surrounds the antenna part 53 of the radar 5 and is fixed to the support member 8 with screws 24 (fixing units). In particular, an end of the cover body 73 of the electromagnetic-wave absorption cover 7 is fixed to the rib 18a or 18b on the support member 8 with the screws 24. The electromagnetic-wave absorption cover 7 is between the concealing part 6 and the radar 5 in the front-rear direction to be concealed from the outside of the vehicle 1A by the concealing part 6. In this way, since the electromagnetic-wave absorption cover 7 and the radar 5 can be concealed from the outside of the vehicle 1A by the concealing part 6, exterior design of the right vehicle lamp 102R can be suitably prevented from being impaired.

According to the present embodiment, the electromagnetic-wave absorption cover 7 configured to absorb electromagnetic waves emitted from the radar 5 surrounds the antenna part 53 of the radar 5. Therefore, it is possible to prevent an electromagnetic wave in the field of view F of the radar 5 from being reflected by the concealing part 6 or another optical component to the antenna part (particularly, the receiving antenna) of the radar 5 to have ill effects on radar data suitably. In this way, it is possible to provide the right vehicle lamp 102R capable of concealing the radar 5 from the outside of the vehicle 1A with reliability of radar data acquired by the radar 5 mounted on the right vehicle lamp 102R ensured. In particular, the radar 5 can reliably receive a reflected electromagnetic wave reflected by an object outside the vehicle 1A and, by the electromagnetic-wave absorption cover 7, can reliably avert reception of the reflected electromagnetic waves reflected by optical components in the right vehicle lamp 102R.

In addition, since the electromagnetic-wave absorption cover 7 is out of the field of view F of the radar 5, it is possible to prevent an electromagnetic wave in the field of view F directly emitted from the radar 5 from being absorbed by the electromagnetic-wave absorption cover 7. Further, since the electromagnetic-wave absorption cover 7 is fixed by the support member 8, it is possible to position the electromagnetic-wave absorption cover 7 to the radar 5 (the antenna part 53) precisely.

Third Embodiment

In the following, a third embodiment of the present disclosure (hereinafter, simply referred to as "the present embodiment") will be described with reference to the drawings. Dimensions of components shown in the drawings may be different from actual dimensions of the components for the sake of convenience. Detailed description of components having the same reference numerals as in the first or second embodiment will not be repeated.

Figure 12:
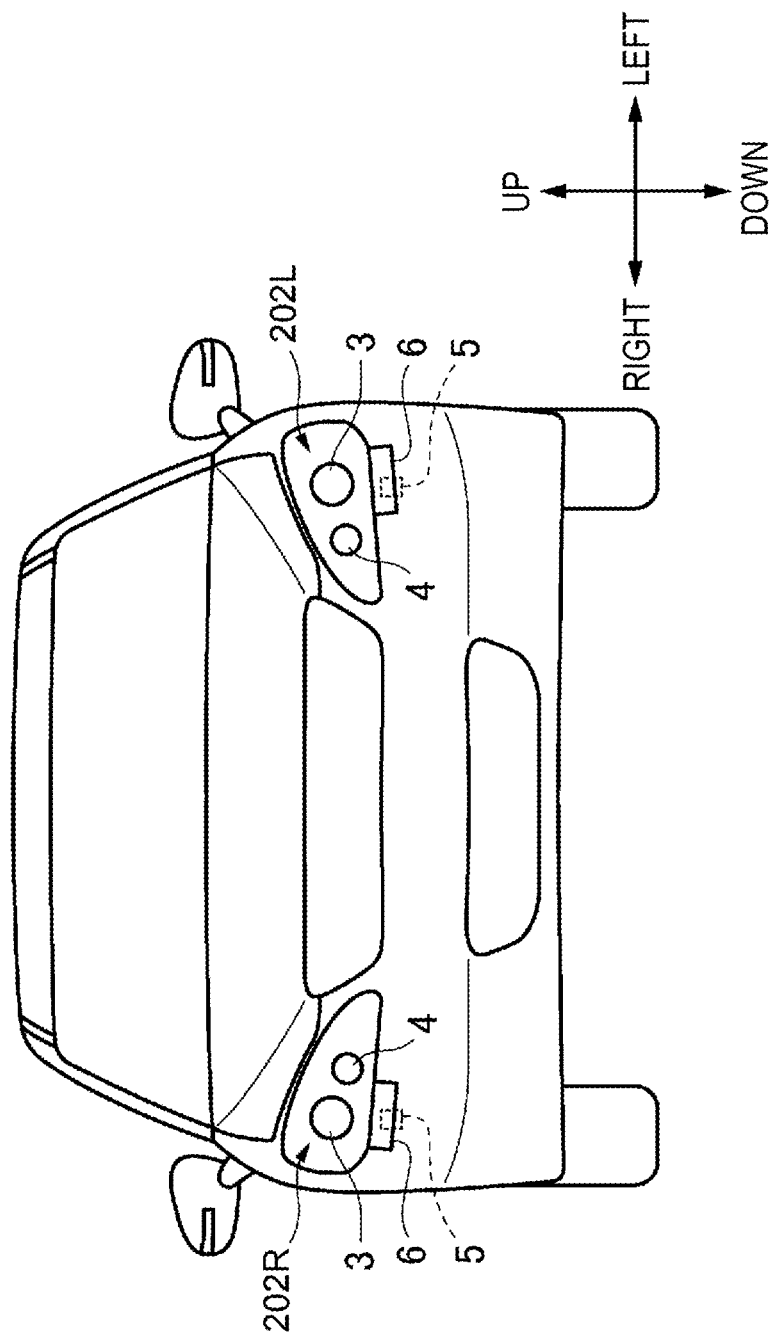
FIG. 12 is a front view of a vehicle including a left vehicle lamp and a right vehicle lamp according to a third embodiment.

First, a vehicle 1B according to the present embodiment will be described with reference to FIG. 12. FIG. 12 is a front view of the vehicle 1B including a left vehicle lamp 202L and a right vehicle lamp 202R. As shown in FIG. 12, the left vehicle lamp 202L is on the front left side of the vehicle 1, and the right vehicle lamp 202R is on the front right side of the vehicle 1B. Each of the left vehicle lamp 202L and the right vehicle lamp 202R includes: the low-beam illumination unit 3; the high-beam illumination unit 4; the radar 5; and the concealing part 6 configured to conceal the radar 5.

In the present embodiment, the left vehicle lamp 202L is similar to the right vehicle lamp 202R. Therefore, in the following, the right vehicle lamp 202R will be described with reference to FIG. 13. For the sake of convenience, the left vehicle lamp 202L and the right vehicle lamp 202R will be generically referred to as a "vehicle lamp 202" simply.

Figure 13:
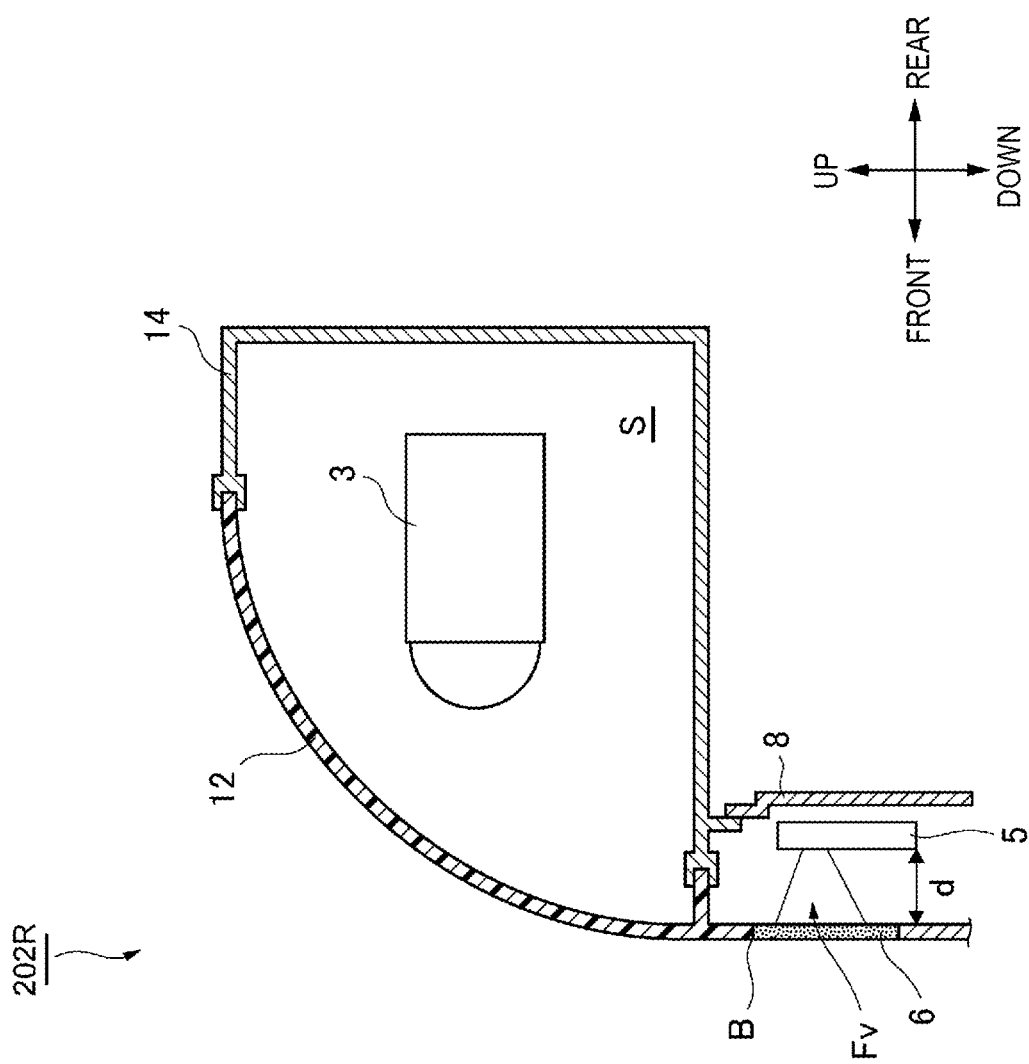
FIG. 13 is a cross sectional view of the right vehicle lamp in the vertical direction.

FIG. 13 is a cross sectional view of the right vehicle lamp 202R in the vertical direction (up-down direction). As shown in FIG. 13, the right vehicle lamp 202R further includes: the lamp housing 14; the lamp cover 12 covering the opening of the lamp housing 14; and the support member 8. The lamp housing 14 may be configured with, for example, a metal member. The lamp cover 12 may be configured with, for example, a transparent resin member. The low-beam illumination unit 3 and the high-beam illumination unit 4 are in the lamp chamber S formed by the lamp housing 14 and the lamp cover 12.

Figure 14:
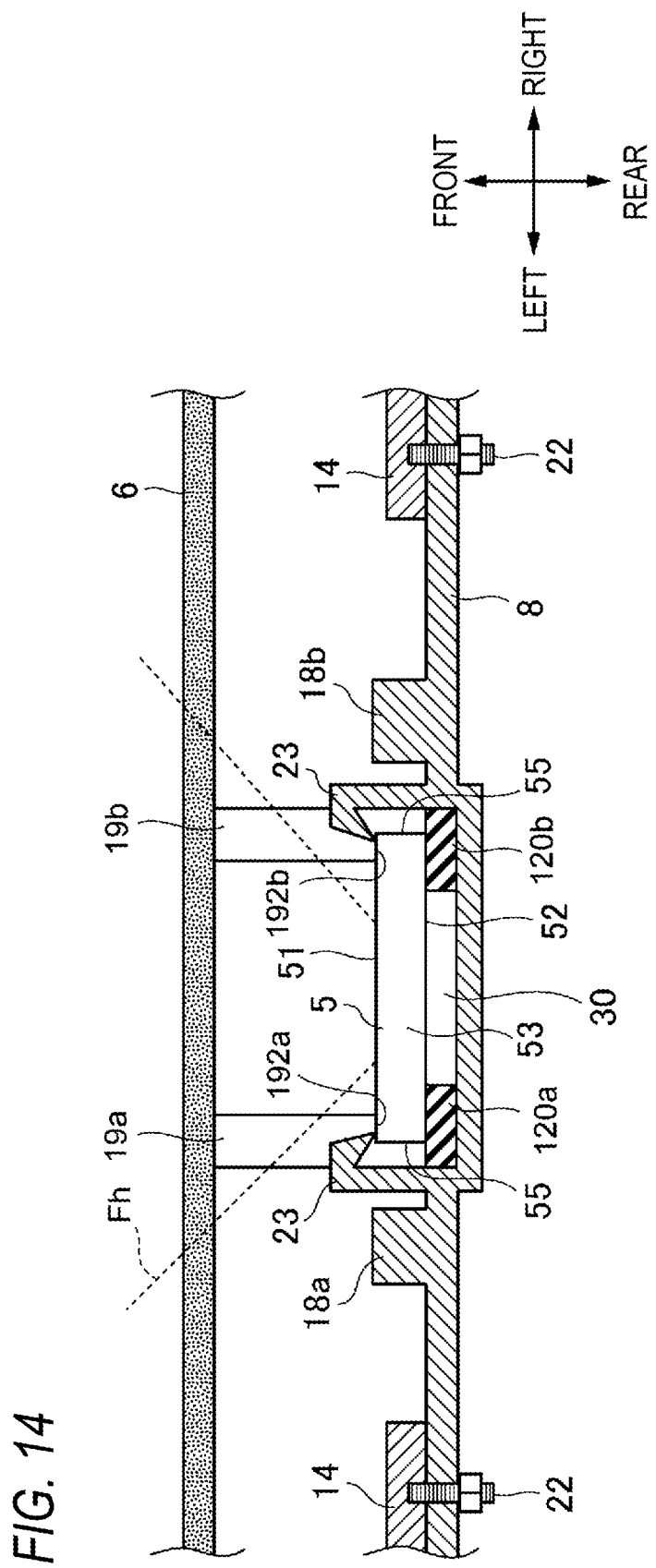
FIG. 14 is a cross sectional view showing the radar, the support member, and the concealing part in the horizontal direction.

Next, the radar 5, the support member 8, and the concealing part 6 will be specifically described with reference mainly to FIG. 14. FIG. 14 is a cross sectional view showing the radar 5, the support member 8, and the concealing part 6 in the horizontal direction. As shown in FIG. 4, the support member 8 is fixed to the lamp housing 14 with the screws 22 as fixing units. The radar 5 is supported and fixed by the lance 23 provided in the support member 8. The radar 5 includes: the front surface 51; the rear surface 52 on the side opposite to the front surface 51; and the side surfaces 55 between the front surface 51 and the rear surface 52. The front surface 51, the rear surface 52, and the side surfaces 55 of the radar 5 may be the front surface, the rear surface, and the side surfaces of the case of the radar 5, respectively. An electromagnetic wave emitted from the antenna part 53 (transmission antenna) of the radar 5 are sent out into air via the front surface 51. A reflected electromagnetic wave reflected by an object outside the vehicle 1B enters the antenna part 53 (receiving antenna) via the front surface 51.

Spacers 120a and 120b are provided between the rear surface 52 of the radar 5 and the support member 8. Thermal conductivity of the spacers 120a and 120b may be lower than the support member 8. The spacer 120a touches the rear surface 52 of the radar 5 and extends in the up-down direction along the side surfaces 55 of the radar 5. Similarly, the spacer 120b touches the rear surface 52 of the radar 5 and extends in the up-down direction along the side surfaces 55 of the radar 5. The spacer 120a faces the spacer 120b in the left-right direction across the air layer 30

In this way, since the two spacers 120a and 120b separated from each other are provided between the radar 5 and the support member 8, the air layer 30 (an example of a thermal insulation layer) can be relatively easily provided between the rear surface 52 of the radar 5 and the support member 8

According to the present embodiment, since the air layer 30 functioning as a thermal insulation layer is provided between the support member 8 and the rear surface 52 of the radar 5, heat radiated from the engine (external heat source) behind the radar 5 is less transferred to the rear surface 52 of the radar 5 via the support member 8. In this way, it is possible to suitably prevent operation performance of the radar 5 (particularly, communication circuit part 54) from declining due to the heat radiated from the engine. Therefore, it is possible to conceal the radar 5 from the outside of the vehicle 1B with reliability of the radar 5 to heat radiated from the outside ensured.

If the spacers 120a and 120b are not provided between the radar 5 and the support member 8, the rear surface 52 of the radar 5 directly touches the support member 8. In this case, heat radiated from the engine is easily transferred from the support member 8 having a high thermal conductivity to the rear surface 52 of the radar 5, thereby the operation performance of the radar 5 significantly declining due to the heat radiated from the engine.

If the thermal conductivity of the spacers 120a and 120b are lower than the support member 8, heat radiated from the engine is less transferred to the radar 5 via the support member 8. Therefore, the spacers 20a and 20b may be configured with a member having a thermal conductivity lower than the support member 8, which is made of a metal member.

Figure 15:
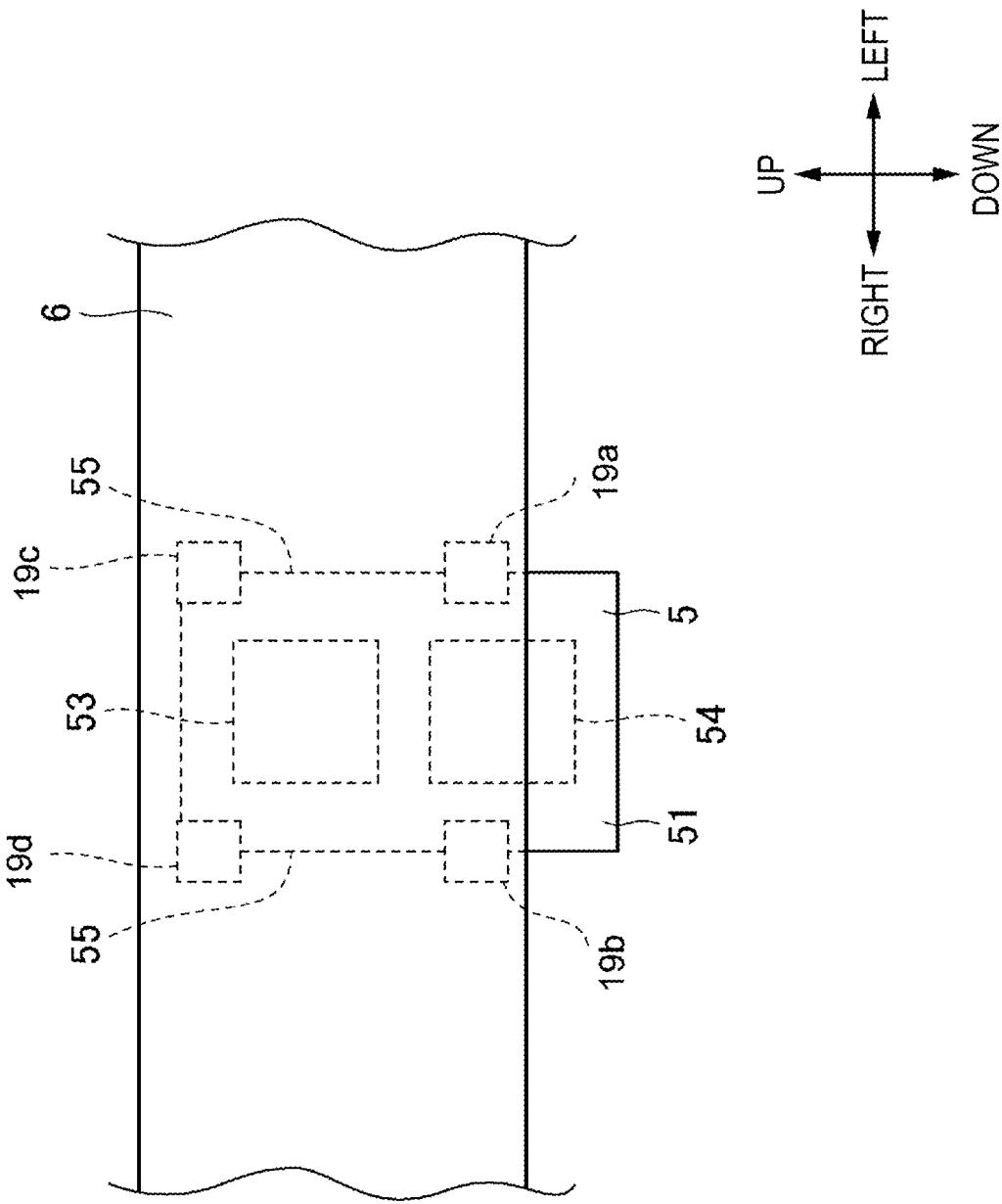
FIG. 15 is a front view showing a positioning part, the radar, and the concealing part according to the third embodiment.

Next, positioning parts 19a to 19d will be described below with reference to FIGS. 14 and 15. FIG. 15 is a front view showing the positioning parts 19a to 19d, the radar 5, and the concealing part 6. As shown in FIGS. 14 and 15, each of the positioning parts 19a to 19d touches the radar 5 to position the radar 5 to the concealing part 6. In other words, the relative position between the radar 5 and the concealing part 6 is determined by the positioning parts 19a to 19d.

Each of the positioning parts 19a to 19d has a concave configured to touch the front surface 51 and the side surface 55 of the radar 5. As shown in FIG. 14, the positioning part 19a has a concave 192a configured to touch the front surface 51 and the side surface 55, and the positioning part 19b has a concave 192b configured to touch the front surface 51 and the side surface 55. By the concave of each of positioning parts touching the front surface 51 and the side surfaces 55 of the radar 5, the radar 5 can be positioned to the concealing part 6 reliably.

In particular, with each of the positioning parts 19a to 19d touching the radar 5, the support member 8 configured to support the radar 5 is fixed to the lamp housing 14 with the screws 22. In this way, by the positioning parts 19a to 19d, the radar 5 can be positioned to the concealing part 6 reliably.

Each of the positioning parts 19a to 19d is formed integrally with the concealing part 6 and is between the concealing part 6 and the radar 5 in the front-rear direction. The positioning parts 19a to 19d may be formed of the same material (for example, an opaque resin material) as the concealing part 6. For example, the concealing part 6 and the positioning parts 19a to 19d may be integrally formed by injection molding using a mold.

As shown in FIG. 15, the positioning part 19a (an example of a first positioning part) faces the positioning part 19b (an example of a second positioning part) in the left-right direction. The radar 5 is between the positioning part 19a and the positioning part 19b in the left-right direction. The positioning part 19c faces the positioning part 19a in the up-down direction. The positioning part 19d faces the positioning part 19b in the up-down direction and faces the positioning part 19c in the left-right direction.

Although the radar 5 is positioned to the concealing part 6 by the four positioning parts 19a to 19d in the present embodiment, the number of positioning parts is not limited to four. For example, the number of positioning parts may be two. In this case, it is preferable that one of the two positioning parts face the other positioning part across the radar 5 in the left-right direction. Further, the two positioning parts may extend along the side surfaces 55 of the radar 5. By providing two or more positioning parts, the radar 5 can be positioned to the concealing part 6 reliably.

According to the present embodiment, the radar 5 is positioned to the concealing part 6 by the positioning parts 19a to 19d formed integrally with the concealing part 6, and the concealing part 6 is formed integrally with the lamp cover 12. In this way, when the right vehicle lamp 202R is positioned to the vehicle 1B, the radar 5 is also positioned to the vehicle 1B. Therefore, the radar 5 can be relatively easily and reliably positioned to the vehicle 1B with the radar 5 concealed from the outside of the vehicle 1B.

Modification

Figure 16:
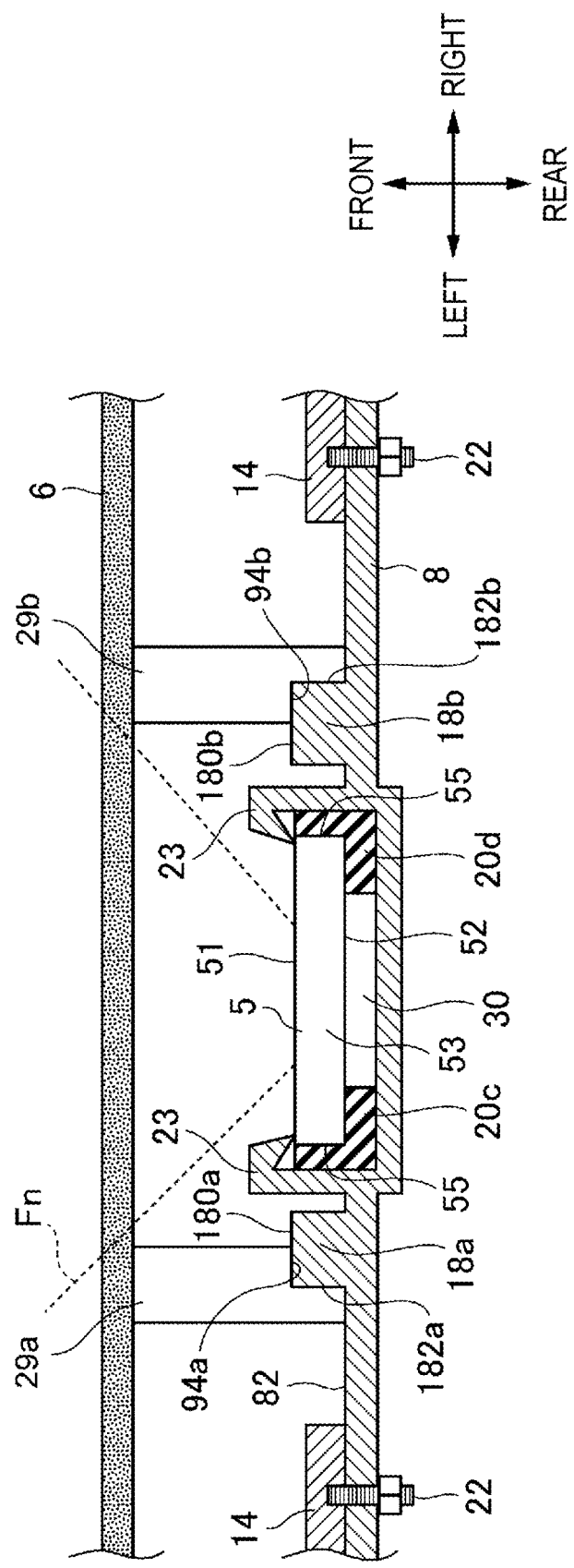
FIG. 16 is a cross sectional view showing the radar, the support member, and the concealing part in the horizontal direction.
Figure 17:
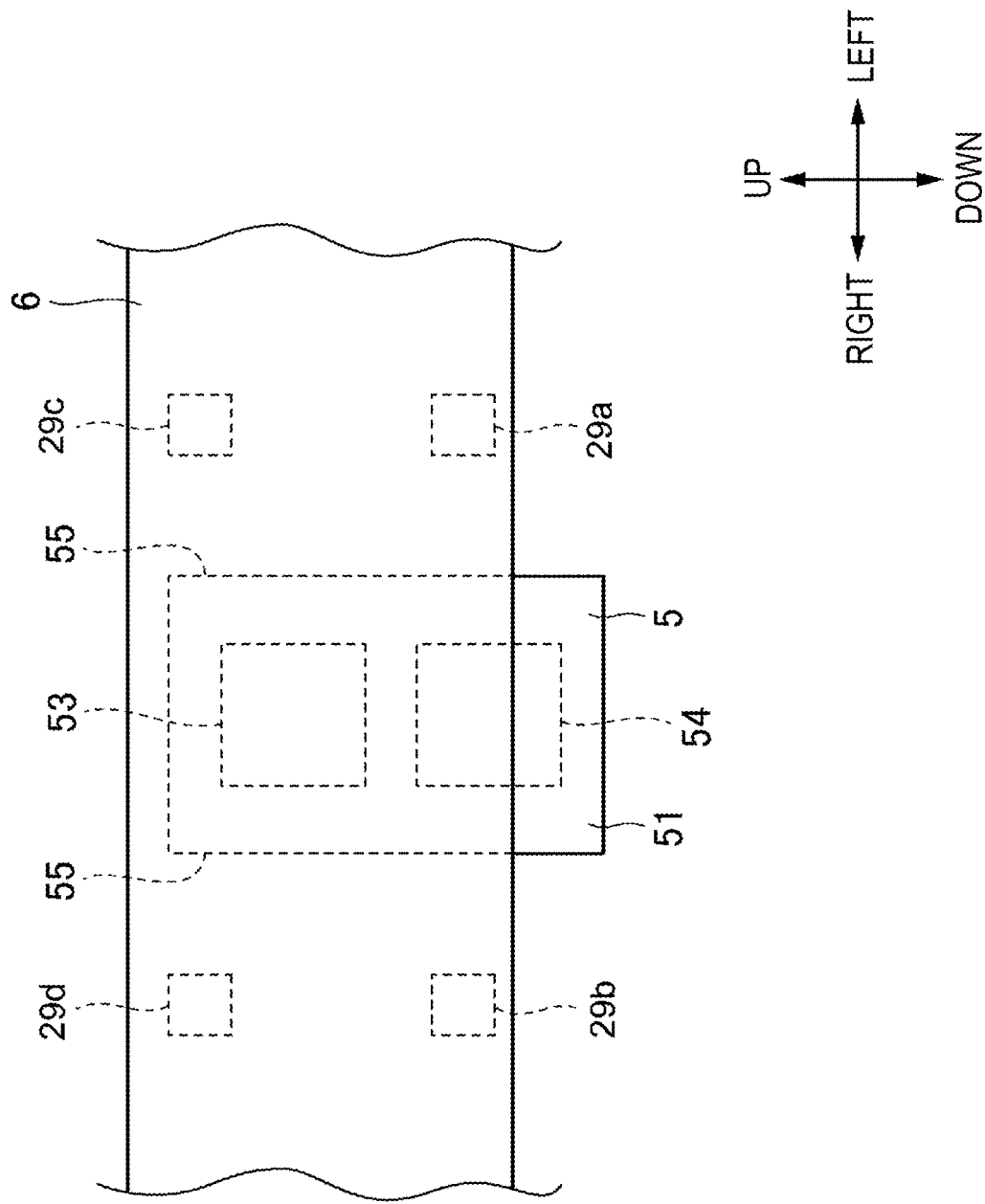
FIG. 17 is a front view showing the positioning part, the radar, and the concealing part according to a modification of the third embodiment.

Next, positioning parts 29a to 29d according to a modification will be described with reference to FIGS. 16 and 17. FIG. 16 is a cross sectional view showing the radar 5, the support member 8, and the concealing part 6 in the horizontal direction. FIG. 17 is a front view showing the positioning parts 29a to 29d according to the modification, the radar 5, and the concealing part 6.

As shown in FIGS. 16 and 17, each of the positioning parts 29a to 29d touches the support member 8 configured to support and fix the radar 5 to position the support member 8 to the concealing part 6. In the present modification, since the radar 5 is positioned by the support member 8, the relative position between the radar 5 and the concealing part 6 is determined in accordance with a relative position between the support member 8 and the concealing part 6.

Each of the positioning parts 29a to 29d has a concave configured to touch the rib 18a or 18b protruding from the front surface 82 of the support member 8. The positioning part 29a has a concave 94a configured to touch a front surface 180a and a side surface 182a of the rib 18a. The positioning part 29b has a concave 94b configured to touch a front surface 180b and a side surface 182b of the rib 18b. By the concave of each of positioning parts touching the rib on the support member 8, the support member 8 can be positioned to the concealing part 6 reliably.

In particular, with each of the positioning parts 29a to 29d touching the support member 8, the support member 8 is fixed to the lamp housing 14 with the screws 22. In this way, by the positioning parts 29a to 29d, the support member 8 can be positioned to the concealing part 6 reliably.

Each of the positioning parts 29a to 29d is formed integrally with the concealing part 6 and is between the concealing part 6 and the radar 5 in the front-rear direction. The positioning parts 29a to 29d may be formed of the same material (for example, an opaque resin material) as the concealing part 6. For example, the concealing part 6 and the positioning parts 29a to 29d may be integrally formed by injection molding using a mold As shown in FIG. 17, the positioning part 29a (an example of the first positioning part) faces the positioning part 29b (an example of the second positioning part) in the left-right direction. The radar 5 is between the positioning part 29a and the positioning part 29b in the left-right direction. The positioning part 29c faces the positioning part 29a in the up-down direction. The positioning part 29d faces the positioning part 29b in the up-down direction and faces the positioning part 29c in the left-right direction Similarly, in the present modification, the number of positioning parts is not limited to four. For example, the number of positioning parts may be two. In this case, it is preferable that one of the two positioning parts face the other positioning part across the radar 5 in the left-right direction. Further, the two positioning parts may extend along the side surfaces 182a or 182b of the rib 18a or 18b of the support member 8.

According to the present embodiment, the support member 8 is positioned to the concealing part 6 by the positioning parts 29a to 29d formed integrally with the concealing part 6. The concealing part 6 is formed integrally with the lamp cover 12, and the radar 5 is fixed by the support member 8. In this way, when the right vehicle lamp 202R is positioned to the vehicle 1B, the radar 5 is also positioned to the vehicle 1B. Therefore, the radar 5 can be relatively easily and reliably positioned to the vehicle 1B with the radar 5 concealed from the outside of the vehicle 1B.

Fourth Embodiment

In the following, a fourth embodiment of the present disclosure (hereinafter, simply referred to as "the present embodiment") will be described with reference to the drawings. Dimensions of components shown in the drawings may be different from actual dimensions of the components for the sake of convenience. Detailed description of components having the same reference numerals as in the first to third embodiments will not be repeated.

Figure 18:
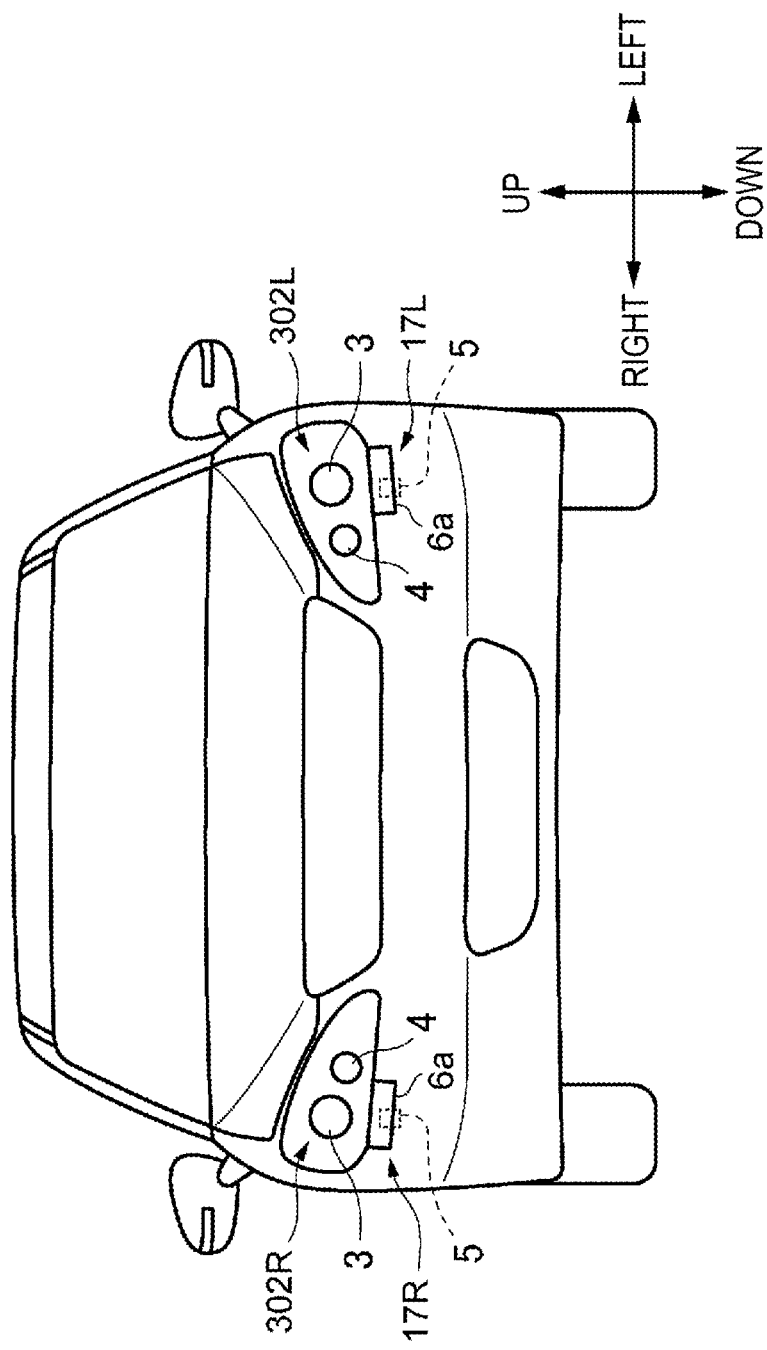
FIG. 18 is a front view of a vehicle including a left vehicle lamp and a right vehicle lamp according to a fourth embodiment.

First, a vehicle 1C according to the present embodiment will be described with reference to FIG. 18. FIG. 18 is a front view of the vehicle 1C including a left vehicle lamp 302L and a right vehicle lamp 302R. As shown in FIG. 18, the left vehicle lamp 302L is on the front left side of the vehicle 1, and the right vehicle lamp 302R is on the front right side of the vehicle 1. Each of the left vehicle lamp 302L and the right vehicle lamp 302R includes the low-beam illumination unit 3 and the high-beam illumination unit 4.

A left radar module 17L is disposed below the left vehicle lamp 302L. A right radar module 17R is disposed below the right vehicle lamp 302R. Each of the left radar module 17L and the right radar module 17R includes: the radar 5; and a concealing part 6a configured to conceal the radar 5.

In the present embodiment, the left vehicle lamp 302L is similar to the right vehicle lamp 302R. Therefore, in the following, the right vehicle lamp 302R will be described with reference to FIG. 19. For the sake of convenience, the left vehicle lamp 302L and the right vehicle lamp 302R will be generically referred to as a "vehicle lamp 302" simply.

Similarly, the left radar module 17L is similar to the right radar module 17R. Therefore, in the following, the right radar module 17R will be described with reference to FIG. 19. For the sake of convenience, the left radar module 17L and the right radar module 17R will be generically referred to as "a radar module 17" simply.

The concealing part 6a faces the radar 5 to conceal the radar 5 from the outside of the vehicle 1C. The concealing part 6a is configured to let an electromagnetic wave emitted from the radar 5 through. The concealing part 6a may be configured with, for example, an opaque resin member. In particular, the concealing part 6a may be configured with a resin member colored in a predetermined color, such as black. The concealing part 6a may be configured with a reflex reflector having a large number of fine prisms. In this case, since light from the outside is totally reflected by the prisms of the reflex reflector, the radar 5 can be concealed from the outside by the reflex reflector. Therefore, the radar 5 can be concealed from the outside of the vehicle 1C by the concealing part 6a, thereby improving exterior design of the right vehicle lamp 302R.

FIG. 19 is a cross sectional view of the right vehicle lamp 302R and the right radar module 17R in the vertical direction (up-down direction). As shown in FIG. 19, the right vehicle lamp 302R further includes: a lamp housing 14a; a lamp cover 12a covering an opening of the lamp housing 14a. The lamp housing 14a may be configured with, for example, a metal member. The lamp cover 12a may be configured with, for example, a transparent resin member. The low-beam illumination unit 3 and the high-beam illumination unit 4 are in a lamp chamber S formed by the lamp housing 14a and the lamp cover 12a.

In the present embodiment, instead of the high-beam illumination unit 4, an adaptive driving beam (ADB) illumination unit configured to emit an ADB light distribution pattern having an irradiation region and a non-irradiation region may be disposed in the lamp chamber S. In addition, a LiDAR unit or a camera may be disposed in the lamp chamber S.

As shown in FIG. 19, the right radar module 17R further includes a support member 8a. The support member 8a is a metal bracket and is configured to support and fix the radar 5. The support member 8a is fixed to the lamp housing 14a with screws 22 (see FIG. 22). Since the right radar module 17R is outside the lamp chamber S of the right vehicle lamp 302R, operation of the radar 5 is suitably prevented from being affected by heat generated from the low-beam illumination unit 3 and the high-beam illumination unit 4.

An upper end of the support member 8a has a positioning part 80a (an example of the second positioning part) configured to engage with a groove 142 formed in the lamp housing 14a. The support member 8a extends downward from the lamp housing 14a. The positioning part 80a may be configured with, for example, an engagement protrusion extending in the left-right direction. The groove 142 may extend in the left-right direction. The positioning part 80a is configured to position the right radar module 17R to the right vehicle lamp 302R by engaging with the groove 142. In other words, the right radar module 17R can be positioned to the right vehicle lamp 302R with an outer side surface of the positioning part 80a touching an inner wall surface of the groove 142.

An upper end of the concealing part 6a has a positioning part 65a (an example of the first positioning part) configured to engage with a groove 122 formed in the lamp cover 12a. The concealing part 6a extends downward from the lamp cover 12a. The positioning part 65a may be configured with, for example, an engagement protrusion extending in the left-right direction. The groove 122 may extend in the left-right direction. The positioning part 65a is configured to position the right radar module 17R to the right vehicle lamp 302R by engaging with the groove 122. In other words, the right radar module 17R can be positioned to the right vehicle lamp 302R with an outer side surface of the positioning part 65a touching an inner wall surface of the groove 122.

Although the positioning part 65a of the concealing part 6a is configured with the engagement protrusion, the present embodiment is not limited thereto. For example, as shown in FIG. 20, a concealing part 6A according to a modification may include a positioning part 65A configured with an engagement groove extending in the left-right direction. In addition, a lamp cover 12A according to the modification may include an engagement protrusion 122A extending in the left-right direction. The positioning part 65A is configured to position the right radar module 17R to the right vehicle lamp 302R by engaging with the engagement protrusion 122A. In other words, the right radar module 17R can be positioned to the right vehicle lamp 302R with an outer side surface of the engagement protrusion 122A touching an inner wall surface of the positioning part 65A.

In addition, a relative position between the concealing part 6a and the radar 5 may be adjusted such that a boundary between the concealing part 6a and the lamp cover 12a (that is, around the positioning part 65a) is out of the field of view Fv of the radar 5 in the vertical direction.

Since the boundary between the concealing part 6a and the lamp cover 12a is out of the field of view Fv of the radar 5, it is possible to prevent an electromagnetic wave in the field of view Fv of the radar 5 from being reflected by the boundary to the receiving antennae of the radar 5 to have ill effects on the radar data. Therefore, it is possible to ensure reliability of radar data acquired by the radar 5 mounted on the right vehicle lamp 302R.

A field of view Fh (see FIG. 22) of the radar 5 in the horizontal direction may be, for example, within a range of 120° to 180°. In other words, the field of view Fh of the radar 5 may be within a range of ±60° to ±90° with respect to a center axis of the radar 5. The field of view Fv of the radar 5 in the vertical direction may be, for example, within a range of 3° to 100°. The field of view of the radar 5 is synonymous with a detection range of the radar 5

In relation to the relative position between the radar 5 and the concealing part 6a, a distance d between the concealing part 6a and the radar 5 in the front-rear direction may be from 20 mm to 100 mm. If the distance d between the concealing part 6a and the radar 5 is not smaller than 20 mm, the reflected electromagnetic waves emitted from the radar 5 and reflected by the concealing part 6a are sufficiently weakened before reaching the receiving antennae of the radar 5. Therefore, it is possible to prevent the reflected electromagnetic waves received by the radar 5 from affecting radar data as noise On the other hand, if the distance between the concealing part 6a and the radar 5 is not greater than 100 mm, it is possible to prevent some electromagnetic waves in the field of view of the radar 5 from being unable to pass through the concealing part 6a. That is, it is possible to prevent some electromagnetic waves unable to pass through the concealing part 6a from being reflected by the boundary between the concealing part 6a and the lamp cover 12a or by another optical component to have ill effects on the radar data as noise Next, a thickness $t_1$ of the concealing part 6a in the front-rear direction will be described with reference to FIG. 21. FIG. 21 is a diagram showing reflected electromagnetic waves R1 and R2 reflected by the concealing part 6a. The thickness $t_1$ of the concealing part 6a shown in FIG. 21 follows the following equation (2):

[Equation 2]

$$t_1 = \frac{\lambda}{2\sqrt{\varepsilon_r}} \times n, \tag{2}$$

where λ is a wavelength of an electromagnetic wave emitted from the radar 5, $\varepsilon_r$ is relative permittivity of the concealing part 6a, and n is a positive integer.

If the thickness $t_1$ of the concealing part 6 follows the above equation (2), the reflected electromagnetic wave R2 reflected by one surface 62a of the concealing part 6a facing the radar 5 and the reflected electromagnetic wave R1 reflected by the other surface 63a of the concealing part 6a on a side opposite to the one surface 62a weaken each other. Specifically, since a phase difference Δθ between the reflected electromagnetic waves R2 and R1 is (2 m+1)π (where m is a non-negative integer), the reflected electromagnetic waves R1 and R2 weaken each other. As a result, it is possible to reduce a reflectance of the concealing part 6a to an electromagnetic wave emitted from the radar 5. Therefore, since intensity of a reflected electromagnetic wave reflected by the concealing part 6a becomes weak, it is possible to prevent a reflected electromagnetic wave received by the radar 5 from affecting radar data as noise. For example, when the wavelength λ of the electromagnetic wave of the radar 5 is 3.922 mm, the relative permittivity $\varepsilon_r$ of the concealing part 6a is 2, and n=1, the thickness $t_1$ of the concealing part 6a is 1.386 mm.

Next, the right radar module 17R will be specifically described with reference mainly to FIG. 22. FIG. 22 is a cross sectional view showing the right radar module 17R in the horizontal direction. As shown in FIG. 22, the support member 8a is fixed to the lamp housing 14a with the screws 22 as fixing units. That is, the support member 8a is fixed to the right vehicle lamp 302R with the screws 22. The radar 5 is supported and fixed by the lance 23 provided in the support member 8a. The radar 5 includes: the front surface 51; the rear surface 52 on the side opposite to the front surface 51; and the side surfaces 55 between the front surface 51 and the rear surface 52. An electromagnetic wave emitted from the antenna part 53 (transmission antenna) of the radar 5 are sent out into air via the front surface 51. A reflected electromagnetic wave reflected by an object outside the vehicle 1C enters the antenna part 53 (receiving antenna) via the front surface 51.

The spacers 20a and 20b are provided between the rear surface 52 of the radar 5 and the support member 8. Thermal conductivity of the spacers 20a and 20b may be lower than the support member 8a. The spacer 20a touches the rear surface 52 and the side surface 55 of the radar 5 and extends in the up-down direction along the side surfaces 55 of the radar 5. Similarly, the spacer 20b touches the rear surface 52 and the side surface 55 of the radar 5 and extends in the up-down direction along the side surfaces 55 of the radar 5. The spacer 20a faces the spacer 20b in the left-right direction across an air layer 30

In this way, since the two spacers 20a and 20b separated from each other are provided between the radar 5 and the support member 8a, the air layer 30 (an example of a thermal insulation layer) can be relatively easily provided between the rear surface 52 of the radar 5 and the support member 8*a*.

According to the present embodiment, since the air layer 30 functioning as a thermal insulation layer is provided between the support member 8*a* and the rear surface 52 of the radar 5, heat radiated from the engine (external heat source) behind the radar 5 is less transferred to the rear surface 52 of the radar 5 via the support member 8*a*. In this way, it is possible to suitably prevent operation performance of the radar 5 (particularly, communication circuit part 54) from declining due to the heat radiated from the engine. Therefore, it is possible to conceal the radar 5 from the outside of the vehicle 1C with reliability of the radar 5 to heat radiated from the outside ensured.

If the spacers 20*a* and 20*b* are not provided between the radar 5 and the support member 8*a*, the rear surface 52 of the radar 5 directly touches the support member 8*a*. In this case, heat radiated from the engine is easily transferred from the support member 8*a* having a high thermal conductivity to the rear surface 52 of the radar 5, thereby the operation performance of the radar 5 significantly declining due to the heat radiated from the engine.

If the thermal conductivity of the spacers 20*a* and 20*b* are lower than the support member 8*a*, heat radiated from the engine is less transferred to the radar 5 via the support member 8*a*. Therefore, the spacers 20*a* and 20*b* may be configured with a member having a thermal conductivity lower than the support member 8*a*, which is made of a metal member.

Next, positioning parts 39*a* to 39*d* (an example of a third positioning part) will be described below with reference to FIGS. 22 and 23. FIG. 23 is a front view showing the positioning parts 39*a* to 39*d*, the radar 5, and the concealing part 6*a*. As shown in FIGS. 22 and 23, each of the positioning parts 39*a* to 39*d* is integrally formed with the concealing part 6*a* and is fixed to the support member 8*a* with the screw 125 to position the support member 8*a* to the concealing part 6*a*. In other words, the relative position between the radar 5 and the concealing part 6*a* is determined by the positioning parts 39*a* to 39*d*.

Each of the positioning parts 39*a* to 39*d* is between the concealing part 6*a* and the support member 8*a* in the front-rear direction. The positioning parts 39*a* to 39*d* may be formed of the same material (for example, an opaque resin material) as the concealing part 6*a*. For example, the concealing part 6*a* and the positioning parts 39*a* to 39*d* may be integrally formed by injection molding using a mold As shown in FIG. 23, the positioning part 39*a* faces the positioning part 39*b* in the left-right direction. The radar 5 is between the positioning part 39*a* and the positioning part 39*b* in the left-right direction. The positioning part 39*c* faces the positioning part 39*a* in the up-down direction. The positioning part 39*d* faces the positioning part 39*b* in the up-down direction and faces the positioning part 39*c* in the left-right direction.

Although the support member 8*a* is positioned to the concealing part 6*a* by the four positioning parts 39*a* to 39*d* in the present embodiment, the number of positioning parts is not limited to four. For example, the number of positioning parts may be two. In this case, it is preferable that one of the two positioning parts face the other positioning part across the radar 5 in the left-right direction. Further, the two positioning parts may extend in the up-down direction. By providing two or more positioning parts, the support member 8 can be positioned to the concealing part 6*a* reliably.

According to the present embodiment, the support member 8*a* is positioned to the concealing part 6*a* by the positioning parts 39*a* to 39*d*. The radar 5 is supported and fixed by the support member 8*a*. In this way, since the radar 5 is positioned by the support member 8*a*, the relative position between the support member 8*a* and the concealing part 6*a* is determined in accordance with the relative position between the radar 5 and the concealing part 6*a*.

In the present embodiment, as shown in FIG. 19, the right radar module 17R is reliably positioned to the right vehicle lamp 302R by both the positioning part 65 in the concealing part 6*a* and the positioning part 80*a* in the support member 8*a*. In this way, the right radar module 17R can be positioned to the right vehicle lamp 302R by the two positioning parts 65 and 80*a*. If the right vehicle lamp 302R has been positioned to the vehicle 1C, the radar 5 is positioned to the vehicle 1C when the right radar module 17R is positioned to the right vehicle lamp 302R. That is, the radar 5 is mounted on the vehicle 1C according to the following processes:

1) a process for assembling the right radar module 17R (the radar 5 is positioned to the right radar module 17R);
2) a process for attaching the right radar module 17R to the right vehicle lamp 302R (the radar 5 is positioned to the right vehicle lamp 302R); and
3) a process for attaching the right vehicle lamp 302R to the vehicle 1C (the radar 5 is positioned to the vehicle 1C).

Therefore, it is possible to provide the right radar module 17R capable of concealing the radar 5 from the outside of the vehicle 1C and relatively easy and reliable positioning of the radar 5 to the vehicle 1C.

The support member 8*a* is fixed to the lamp housing 14*a* with the right radar module 17R positioned to the right vehicle lamp 302R by the positioning parts 65 and 80*a*. Therefore, the right radar module 17R is fixed to the right vehicle lamp 302R with the right radar module 17R reliably positioned to the right vehicle lamp 302R.

Although the right radar module 17R is positioned to the right vehicle lamp 302R by the two positioning parts 65 and 80*a*, the present embodiment is not limited thereto. For example, the positioning part may be provided only in one of the concealing part 6*a* and the support member 8*a*. In this case, the right radar module 17R can be positioned to the right vehicle lamp 302R by only one of the two positioning parts 65 and 80*a*. For example, the positioning part 80*a* and the groove 142 may be formed in a shape of a cross in a top view. In this case, by engaging the positioning part 80*a* with the groove 142, it is possible to position the right radar module 17R to the right vehicle lamp 302R reliably.

Although embodiments of the present invention have been described above, it goes without saying that the technical scope of the present invention should not be interpreted limitedly to the description of the embodiments. It is to be understood by those skilled in the art that the embodiments are mere examples and various modifications may be made within the scope of the invention described in the claims. The technical scope of the present invention should be determined based on the scope of the invention described in the claims and equivalents thereof.

What is claimed is:

1. A vehicle lamp comprising:
a lamp housing;
a lamp cover covering an opening of the lamp housing;
an illumination unit disposed in a lamp chamber formed by the lamp housing and the lamp cover;
a radar configured to acquire radar data indicating surroundings of a vehicle by emitting an electromagnetic wave outside the vehicle;

a concealing part that faces the radar to conceal the radar from the outside of the vehicle and is configured to let the electromagnetic wave emitted from the radar through;
an electromagnetic-wave absorption cover surrounding an antenna part of the radar to absorb the electromagnetic wave emitted from the radar, and
a support member that is fixed to the lamp housing and is configured to support the radar, wherein
the electromagnetic-wave absorption cover is fixed to the support member.

2. The vehicle lamp according to claim 1, wherein the electromagnetic-wave absorption cover is out of a field of view of the radar.

3. The vehicle lamp according to claim 1, wherein the electromagnetic-wave absorption cover is between the concealing part and the radar to be concealed from the outside of the vehicle by the concealing part.

4. The vehicle lamp according to claim 1, wherein the concealing part is formed integrally with the lamp cover.

5. The vehicle lamp according to claim 1, wherein a thickness t of the concealing part follows the following equation:

$$t = \lambda/2\varepsilon_r^{1/2} \times n,$$

where $\lambda$ is a wavelength of the electromagnetic wave emitted from the radar, $\varepsilon_r$ is a relative permittivity of the concealing part, and n is a positive integer.

6. The vehicle lamp according to claim 1, wherein a distance between the concealing part and the radar is not smaller than 20 mm and not greater than 100 mm.

7. The vehicle lamp according to claim 1, wherein the electromagnetic-wave absorption cover is supported only by the support member.

* * * * *